Dec. 13, 1932.  E. A. BRINER  1,890,931
AIRCRAFT AND METHOD OF FLIGHT
Filed Jan. 6, 1928   19 Sheets-Sheet 1

Witness

Inventor

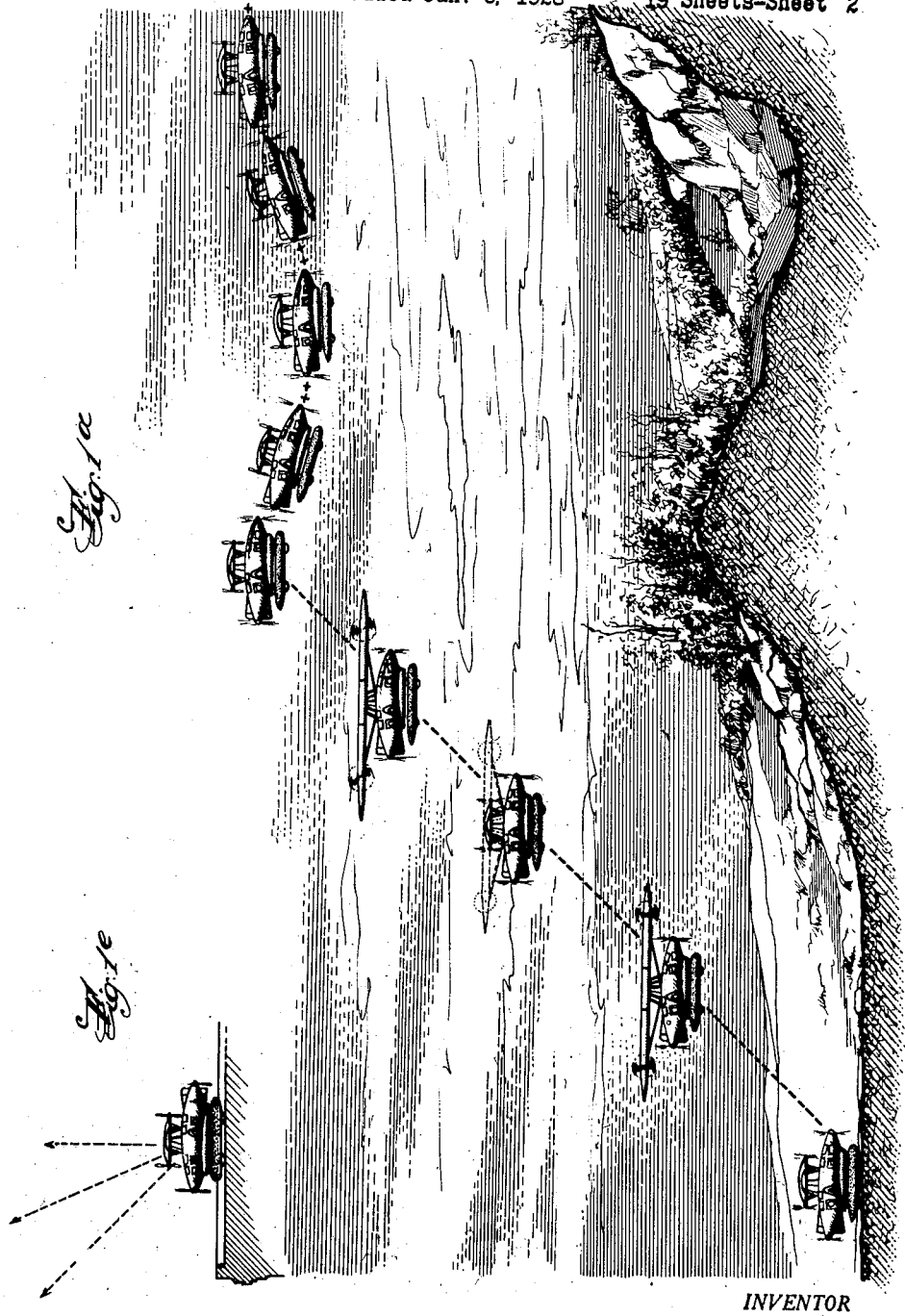

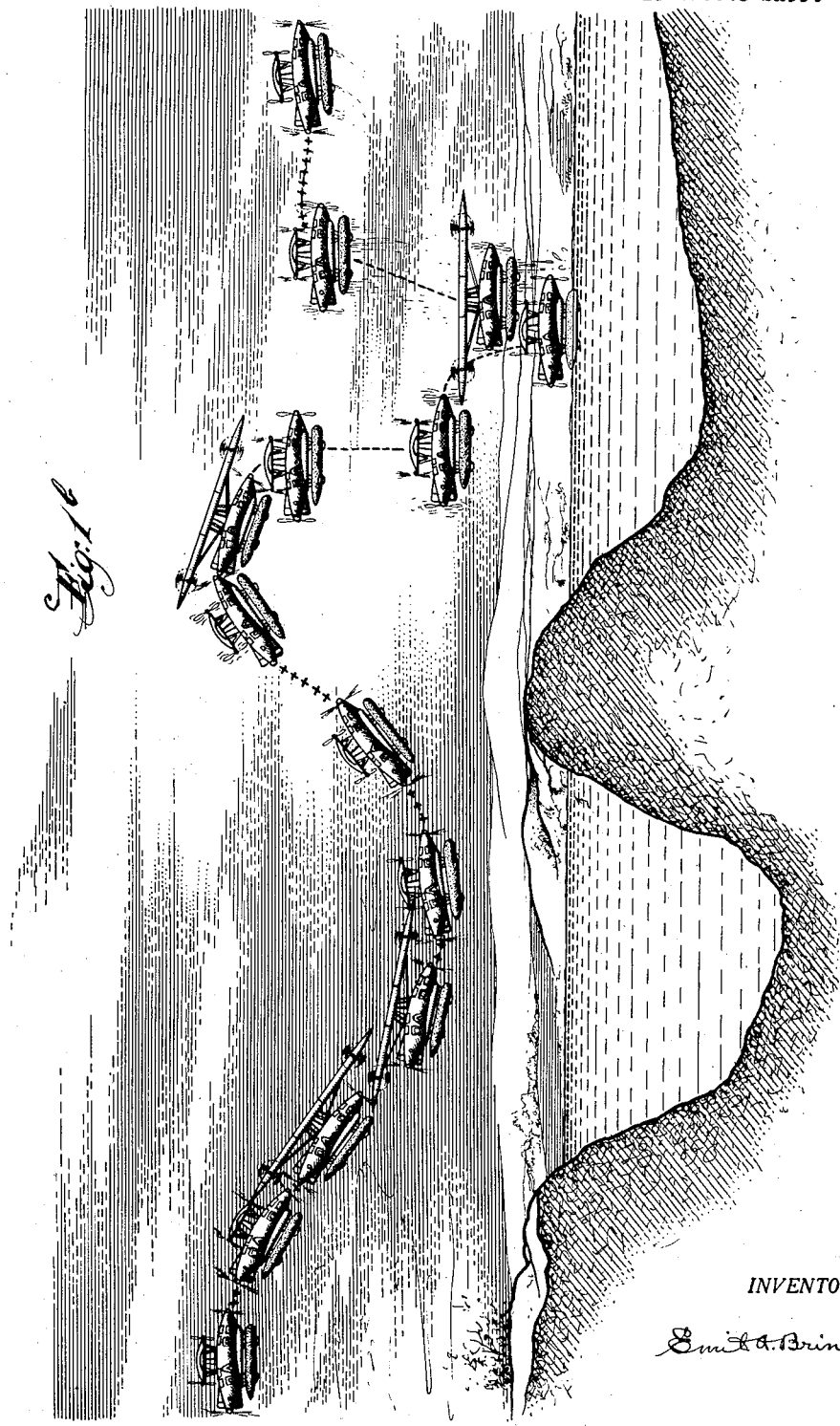

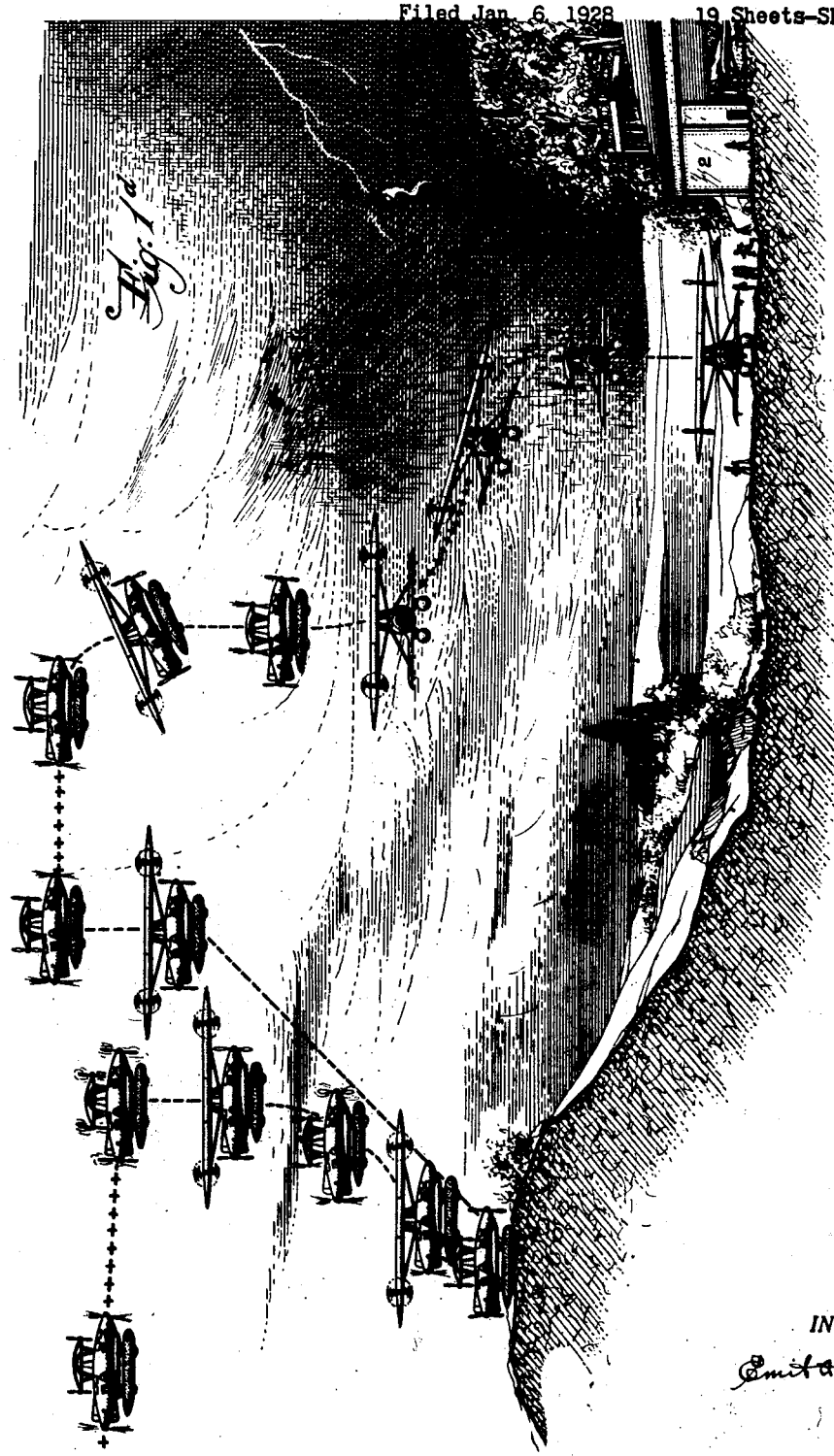

Dec. 13, 1932.    E. A. BRINER    1,890,931
AIRCRAFT AND METHOD OF FLIGHT
Filed Jan. 6, 1928    19 Sheets-Sheet 7

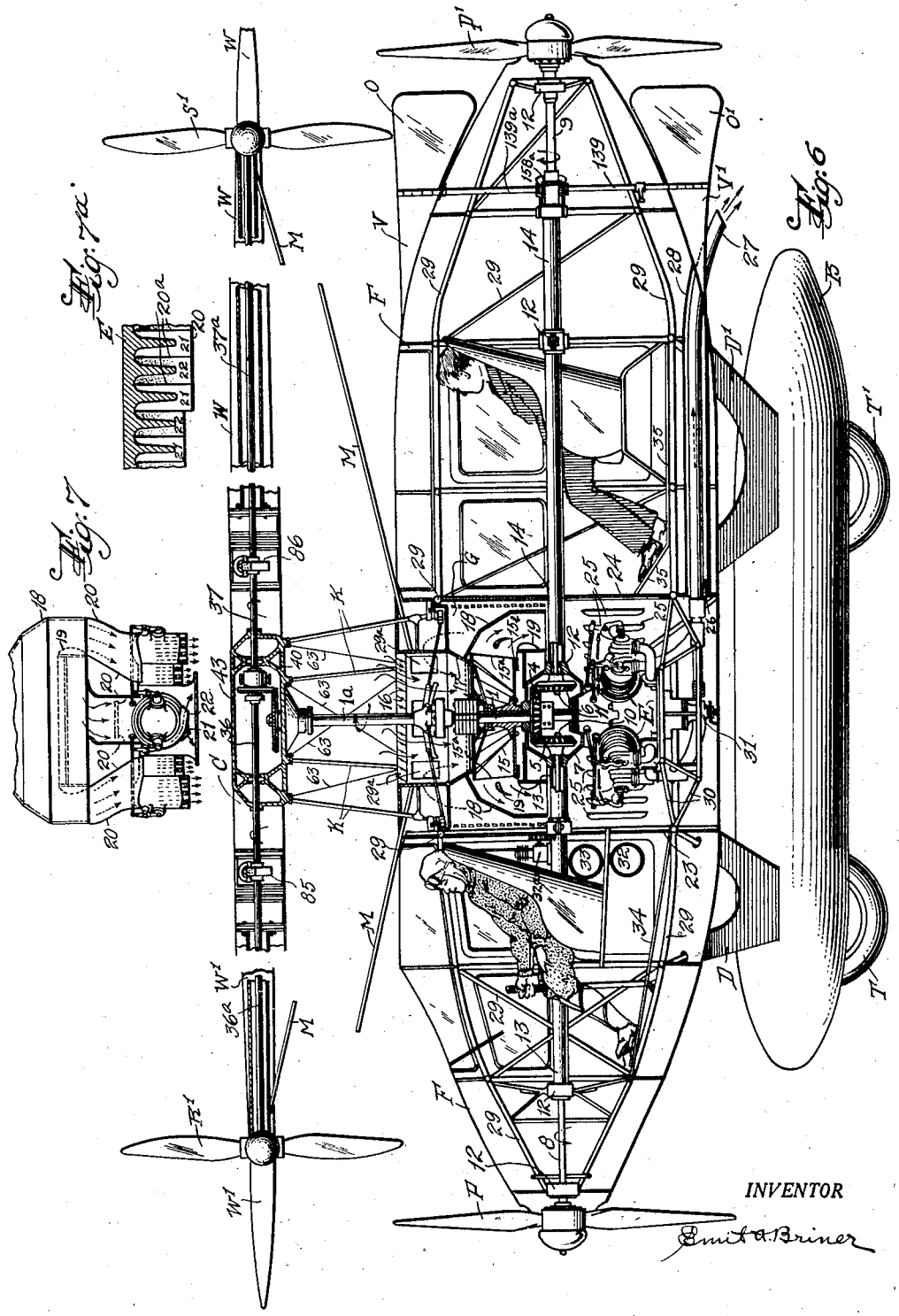

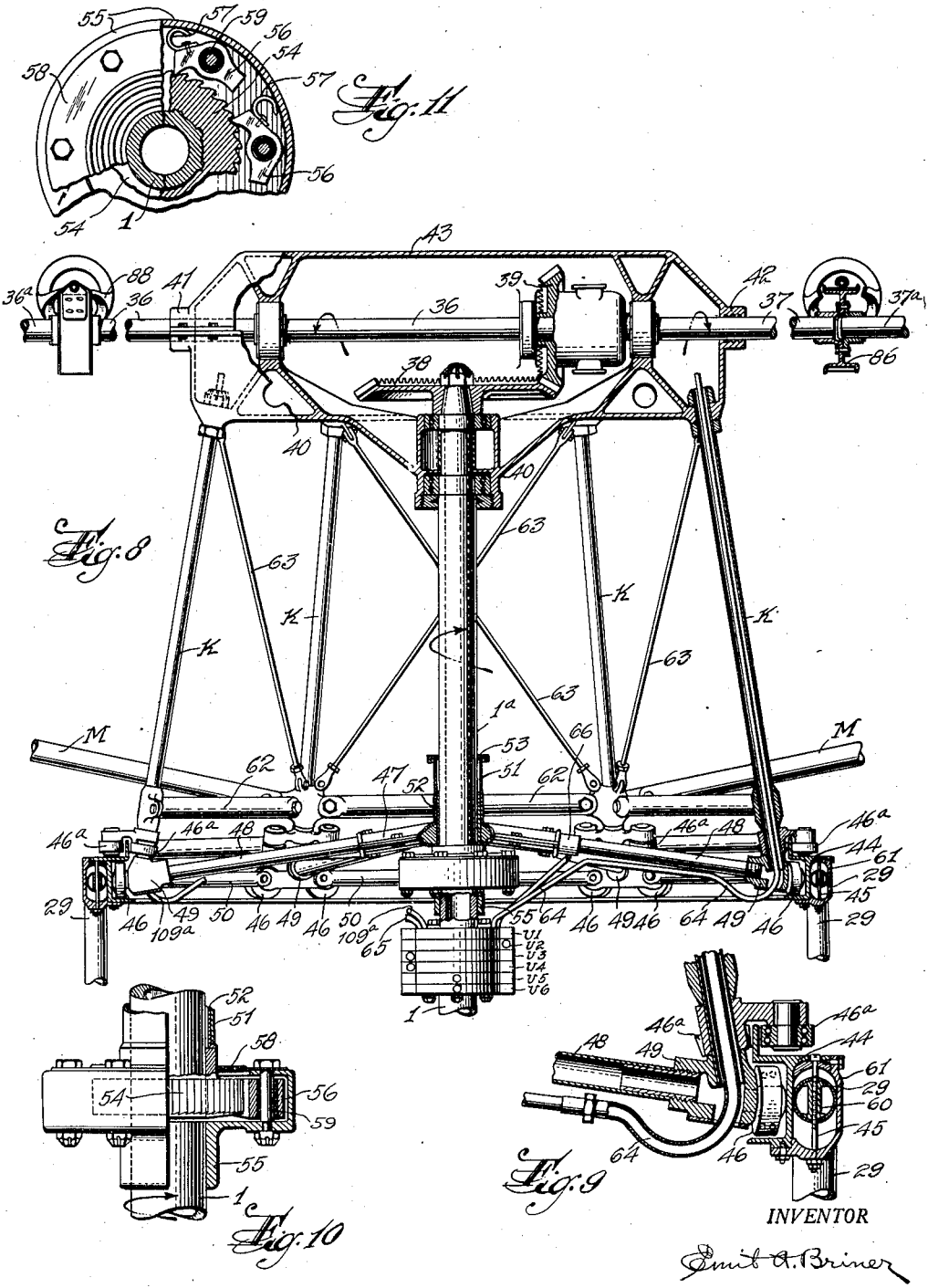

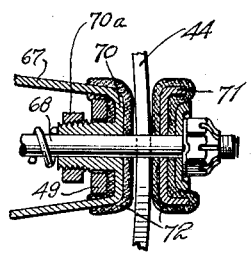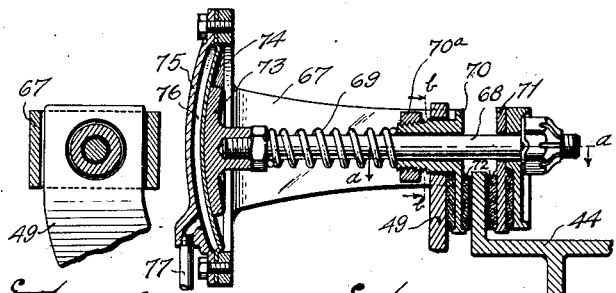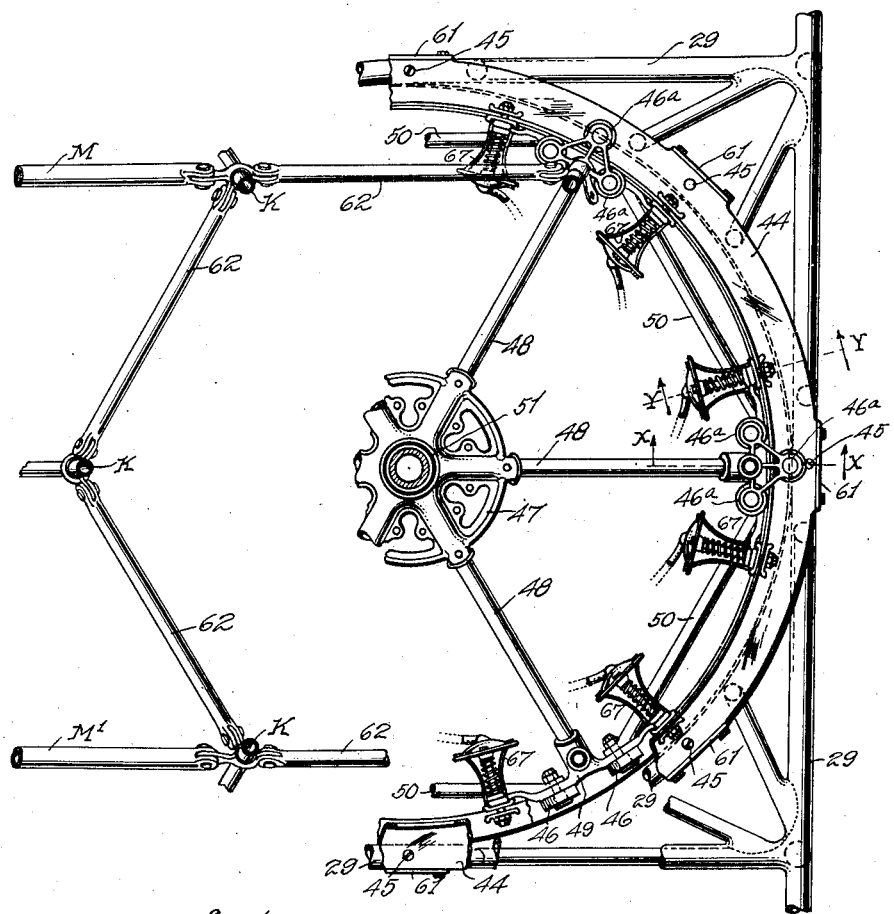

Dec. 13, 1932.  E. A. BRINER  1,890,931
AIRCRAFT AND METHOD OF FLIGHT
Filed Jan. 6, 1928   19 Sheets-Sheet 11

Witness  Inventor

Dec. 13, 1932. E. A. BRINER 1,890,931
AIRCRAFT AND METHOD OF FLIGHT
Filed Jan. 6, 1928 19 Sheets-Sheet 12
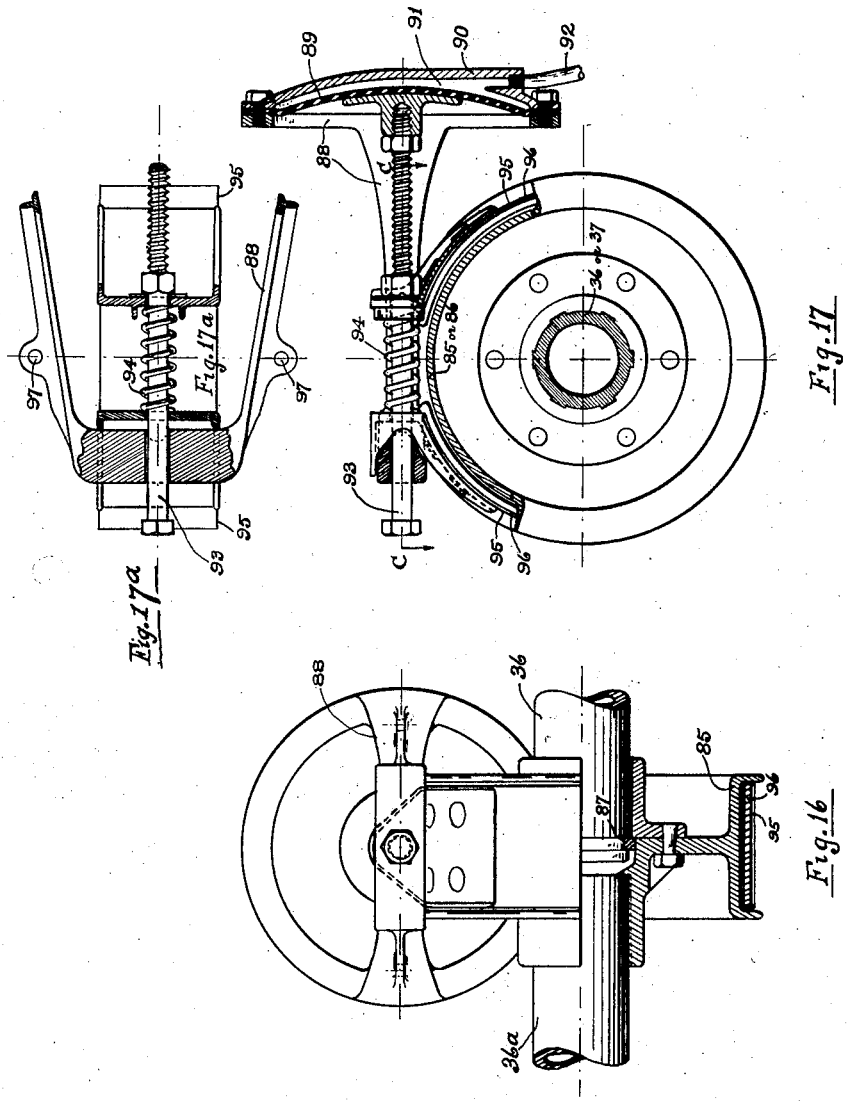

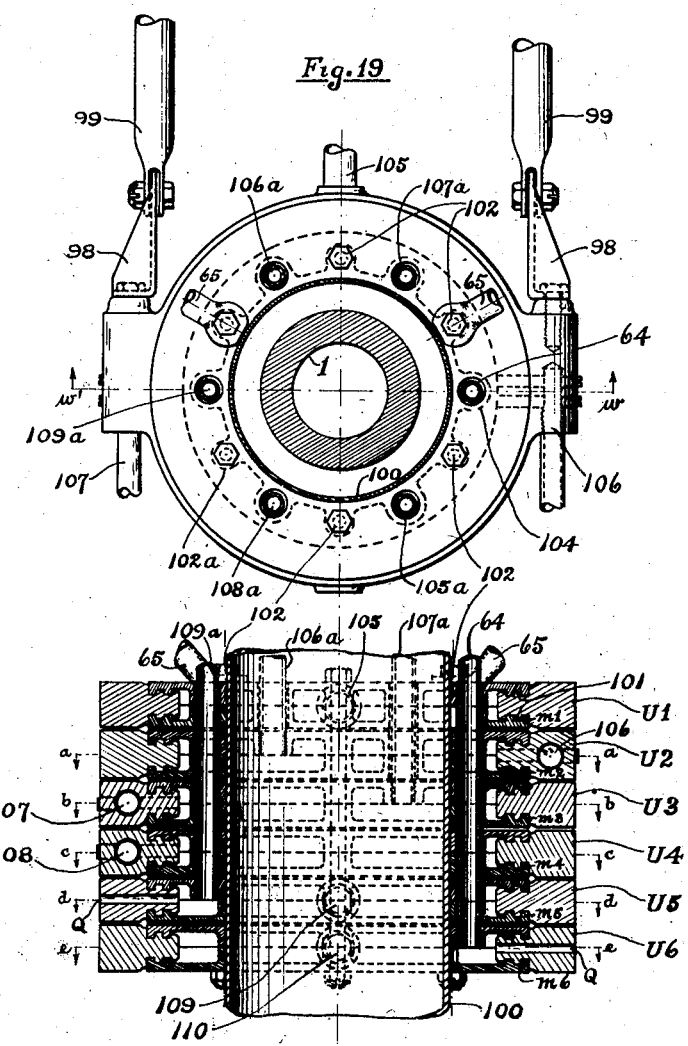

Dec. 13, 1932.     E. A. BRINER     1,890,931
AIRCRAFT AND METHOD OF FLIGHT
Filed Jan. 6, 1928     19 Sheets-Sheet 14
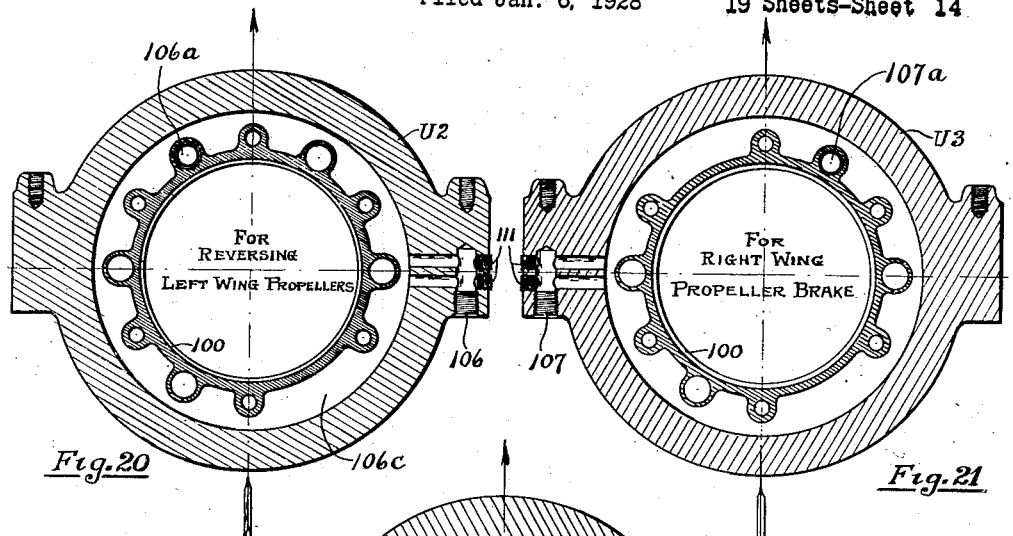
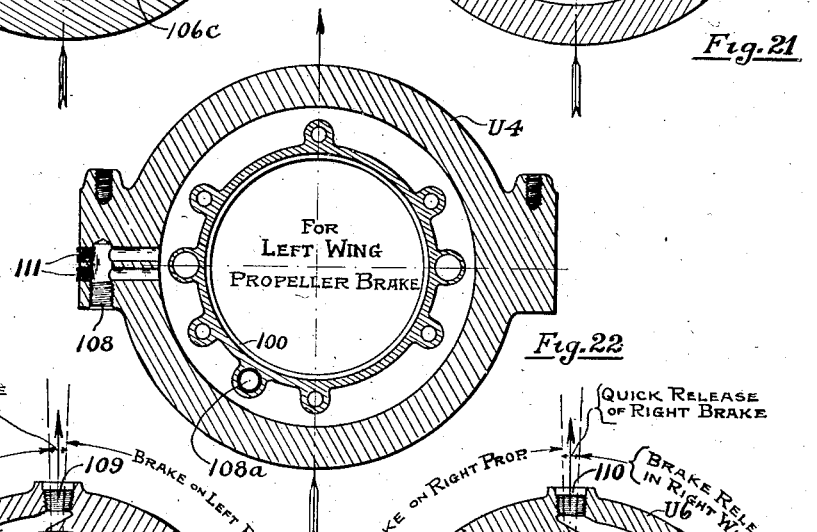
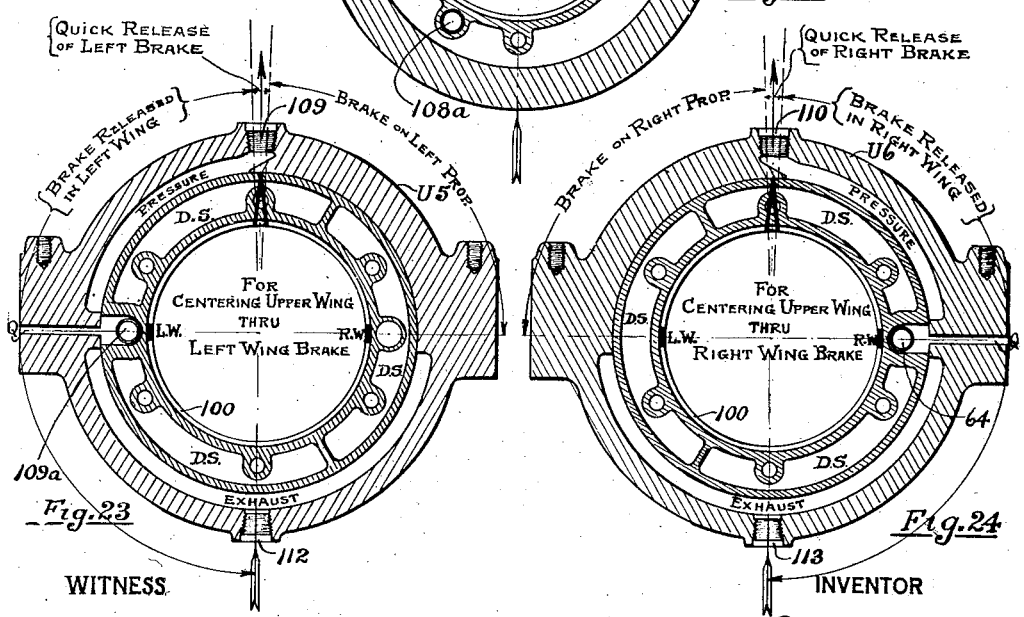
WITNESS     INVENTOR

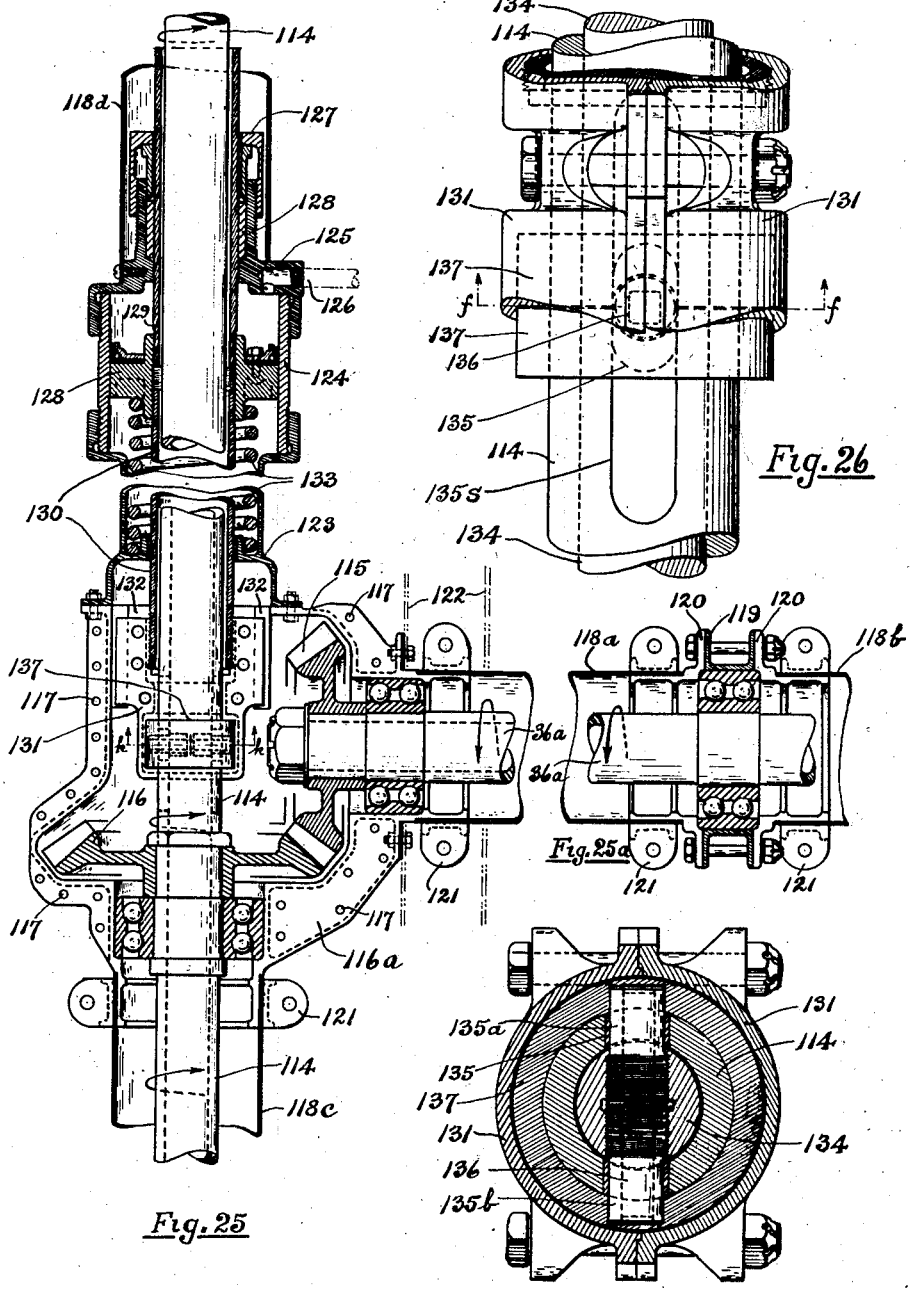

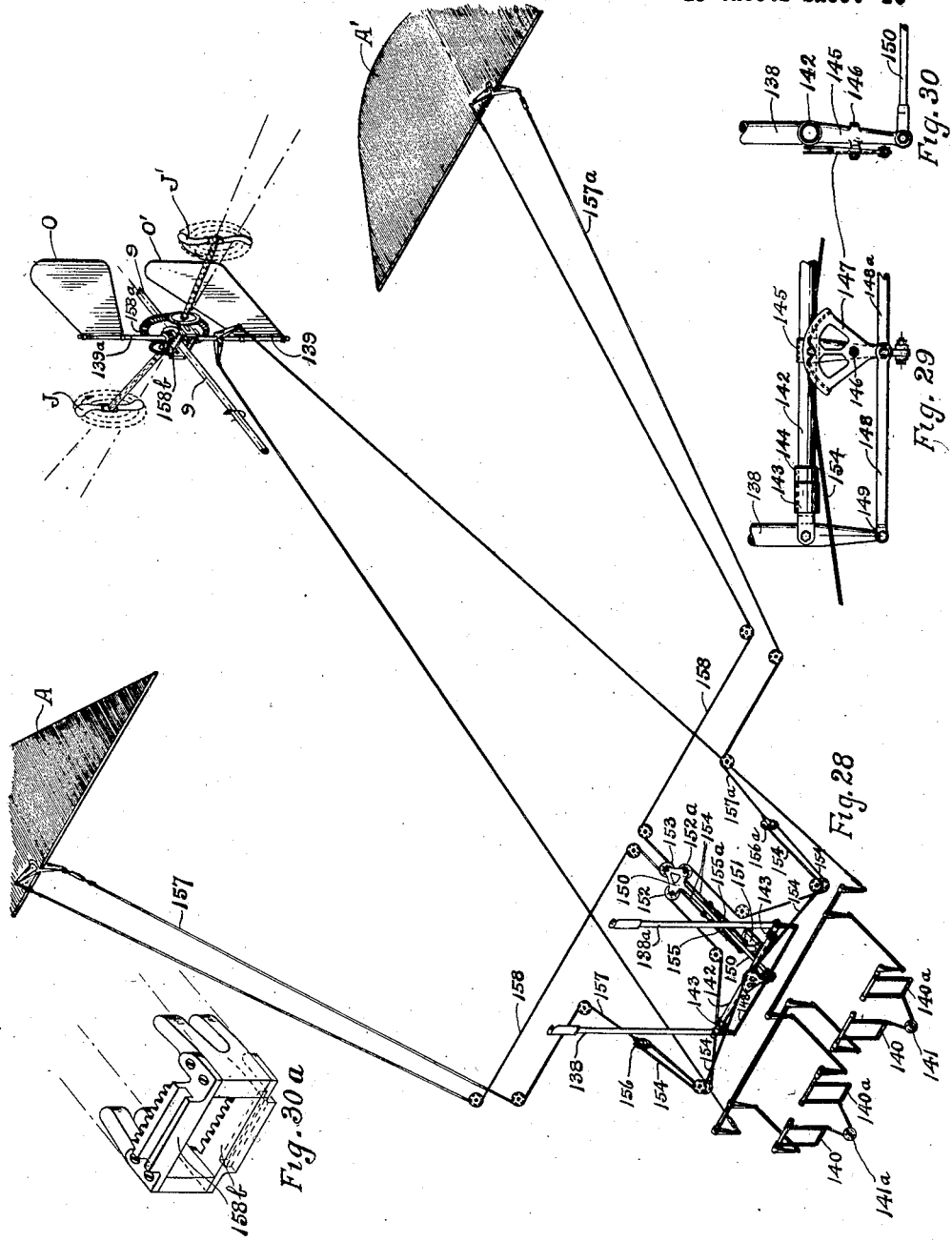

Dec. 13, 1932.     E. A. BRINER     1,890,931
AIRCRAFT AND METHOD OF FLIGHT
Filed Jan. 6, 1928     19 Sheets-Sheet 17

Witness

Inventor

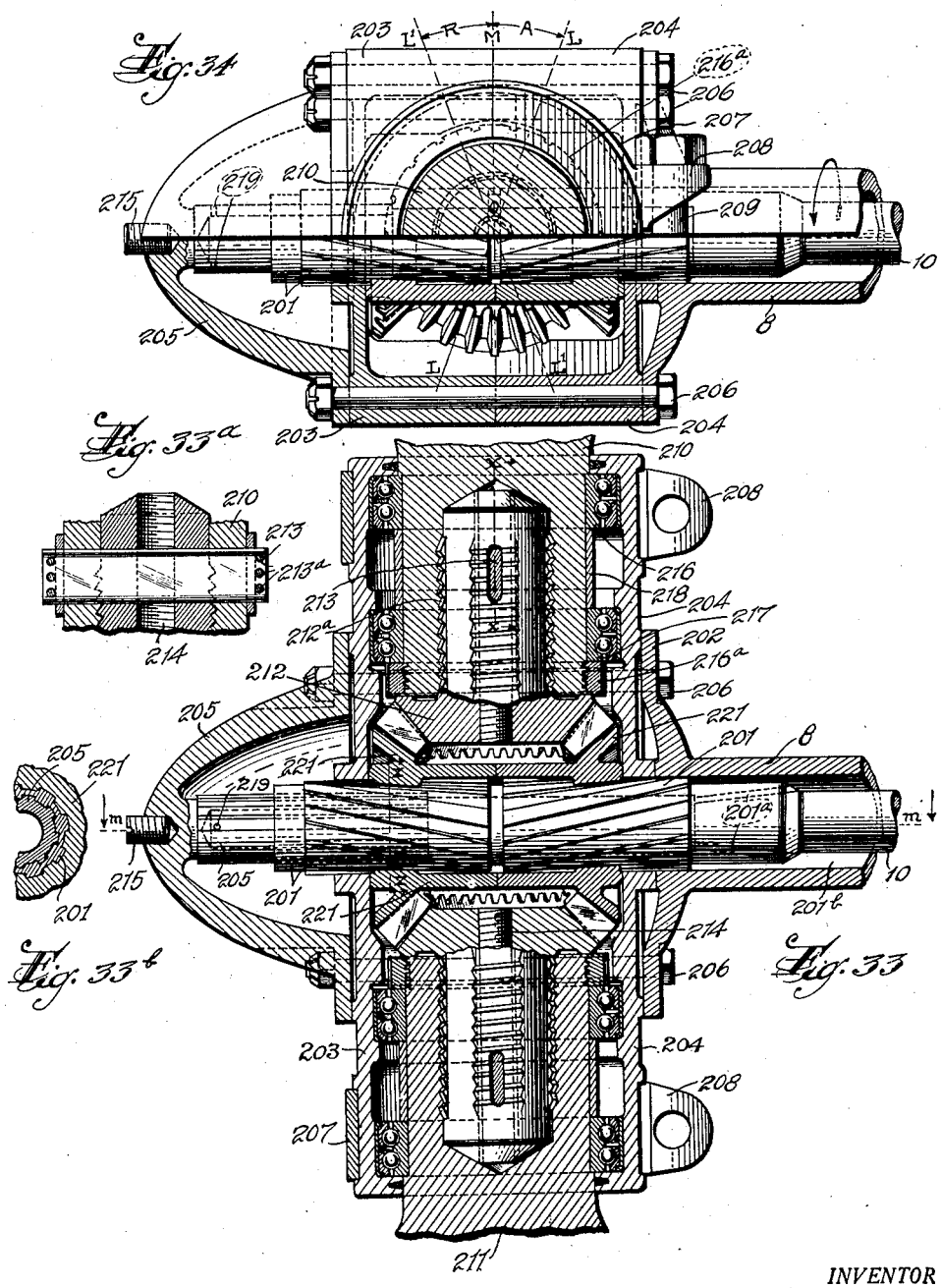

Dec. 13, 1932.  E. A. BRINER  1,890,931
AIRCRAFT AND METHOD OF FLIGHT
Filed Jan. 6, 1928   19 Sheets-Sheet 19
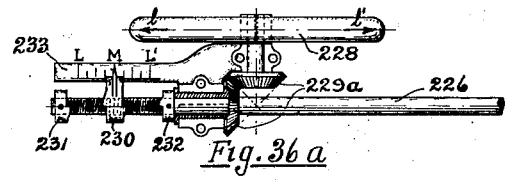
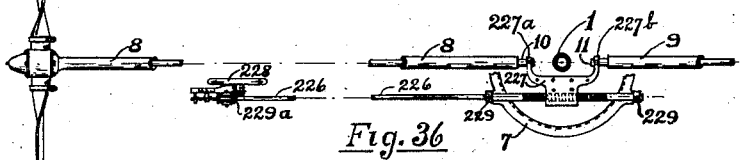
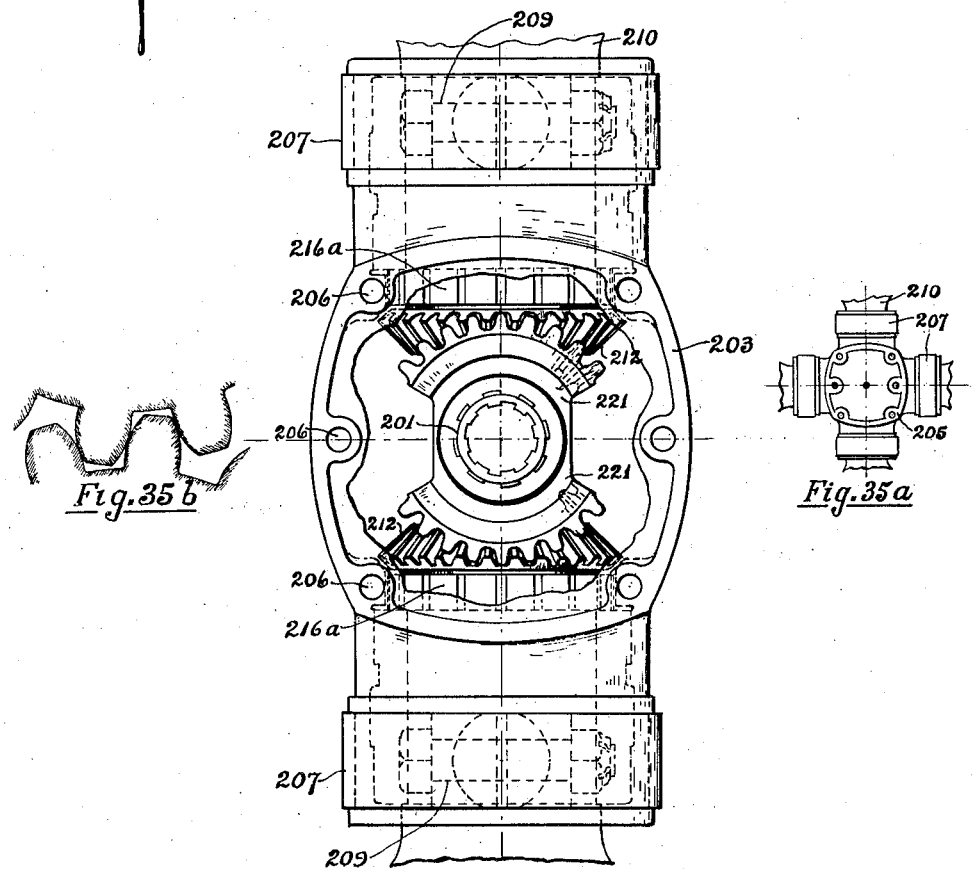

Patented Dec. 13, 1932

1,890,931

UNITED STATES PATENT OFFICE

EMIL A. BRINER, OF EAST ORANGE, NEW JERSEY

AIRCRAFT AND METHOD OF FLIGHT

Application filed January 6, 1928. Serial No. 244,829.

This invention relates to aircraft and a method of flight having for its object: greater safety in navigating the air, including greater range of safe angles for climb and descent at low speeds; practical ability for attaining nearly vertical ascent or descent, either in "taking off" or in landing; and ability to hover in the air with a heavier-than-air machine. Provision has been made to attain greater stability of the airplane as regards pitching, rolling, and yawing (swinging about a vertical axis). A number of devices and controls have been provided for various purposes and contingencies. Some of these devices act automatically. Some controls are arranged to work automatically upon pressing a button with the foot. I particularly seek to achieve useful low speed ranges, which are so much needed to secure safety in commercial aviation. The beginner naturally wishes to move slowly, whether driving on the ground or piloting in the air. It is only by attaining safe low speeds by actual demonstration that genuine public confidence can be gained. The present engine-driven airplane "takes off" and lands at speeds around forty to seventy miles an hour, a condition that does not promote nor warrant much public confidence for a beginner. My invention relates especially to an airplane, or helicopter, and a method of flight with ability to "take off", fly, or land at low speeds, of from zero up to perhaps forty miles per hour in still air.

Webster's Dictionary shows the word "helicopter" to be derived from two Greek words "spiral" and "wing". In practice, these spiral wings have usually been propellers. In its broader sense of spiral wing, the invention does perform as a "helicopter". It has a large wing that may be revolved to follow a spiral course. It is not a helicopter in the sense of having a propeller, or propellers, used as lifting planes. My object is to use the helicopter principle for "taking off" and landing, and in getting underway or slowing down for a stop. The helicopter principle is also very useful for slow speed flying, for observation, photography, all forms of rescue work, etc., when so controlled by the pilot. I firmly believe that by achieving this one point of safe slow flight alone, the invention will gradually win popular approval by making the landing and "take off" gradual and sure. My invention also provides the essential attributes of a good gliding plane; so that a pilot can "take off", fly, or land in the ordinary manner of gliding planes at any speed that would be possible in straight flight.

In other words, the invention may be "hopped off" or landed, either as a helicopter or as an airplane. It is also possible with control apparatus herein described to shift with safety from either method of flight to the other while in the air. This can be done at such speeds as practical "air sense" would deem prudent. Using the helicopter principle, described herein, makes it feasible to "take off" or land in small spaces, and in places where long smooth runs are not available. Emergency landings may mean swamp, mud, sand, bushes, or even forest. The plane that can come nearest to meeting these contingencies with a fair degree of safety is the one nearest general utility. At present there is a strong commercial longing for an airplane that can land upon a flat roof or upon the deck of a steamer, without the expensive elaboration necessary in naval airplane carriers. I have hopes that my invention will be able to meet nearly all of these conditions.

Existing types of airplanes, when operated as seaplanes or flying boats, require a hydroplane type of hull to enable the plane to attain the necessary speed on the surface for properly "taking off" and alighting on the water. My object is to avoid long runs on the surface of the water as well as along the ground. In the construction herein described, I have shown a couple of round pontoons streamlining the landing gear. They serve to make possible the double purpose of "taking off" or alighting safely, either on the ground or on the water, when the helicopter principle is used. So far as I know, there is no published record of a helicopter that has been able to rise from the water. I expect to demonstrate this possibility. Published records to date indicate that helicopters have not attained results of a useful commercial nature in rising from the ground, and very little speed. My plane has been designed to operate either from the ground, the water, or as an airplane. It may, therefore, be classed both as a helicopter and as an amphibian. Of course, it may be desirable to leave off either the wheels or the floats. Such modification would effect a corresponding increase in speed.

For the intelligent understanding of this method of flight and the apparatus adapted to carry it out, it is necessary to comprehend certain fundamental principles of mechanics and aerodynamics to distinguish between things that may look somewhat similar, and yet are fundamentally different. At such point of understanding one method may be discarded, as impractical, and the other successfully adopted.

First of all, I have discarded entirely the possibility of attaining commercial success with any form of aircraft depending upon propellers, large or small, that attempt to lift the airplane by revolving the propellers in a horizontal plane. In such cases the propellers themselves cause strong descending currents of air. It may be possible to barely achieve such a thing close to the ground, and I believe that that much has been done; but I maintain that it is commercially of no value to waste power by trying to lift aircraft upon a descending column of air set up by the propellers. For this reason, I discard such methods entirely and use all my propellers so as to revolve in vertical planes, causing horizontal currents of air. Upon these horizontal currents, and upon the surrounding atmosphere, it becomes possible to support airplane surfaces of large proportions to sustain the weights necessary for commercial success.

Second, I have rejected entirely the possibility of attaining commercial success with any form of helicopter (spiral wing) attempting to revolve that wing through the air by propellers of internal combustion motors placed far out from the center and supported by the revolving wing. There are some of these in Patent Office records and pictured in books. They may look somewhat similar to my construction on paper; but they are nevertheless fundamentally and essentially different. They are unsound in mechanical principle. While they may be possible, they are commercially impracticable. It is a simple matter to show a picture of a pair of enclosed airplane motors with their propellers out upon and sustained by a revolving wing. Such drawings furnish no conception of the weights. Airplane motors have been made to operate when installed on the wings, but always near the fuselage of ordinary airplanes for straight flight. Such arrangement does not afford conclusive proof that they can be made to operate successfully upon a revolving wing. The revolving wing introduces centrifugal forces, and a constantly changing position of motors in flight relative to the wind. Such conditions radically alter the problem to one of a different character.

There are enormous centrifugal forces with corresponding gyroscopic forces set up in swinging a pair of airplane motors through the air far out on a big radius from the center. Such weights and bulk are out of all proportion to the functions required of a revolving wing structure. The motors must not only delicately balance in themselves, but they must also balance each other. They present an ever changing wind resistance to flight. The principal difficulty is swinging such weights upon a thin light structure. The mechanical difficulties of holding such centrifugal forces, the shape of standard motors, etc., are all out of harmony with the mechanical principle and aerodynamic functions of light wing structures. Such methods bear no fundamental relation to the method of flight disclosed herein. I reject the idea of using motors on a revolving wing.

Third, there is another kind of helicopter that has been pictured in books and patents, that consists of a motor and its vertical shaft without any differential gears for the transmission of power to propellers for turning a revolving plane or planes. These pictures suggest vague practical possibilities. They may possess the germ of an idea, but no evidence of their ability to fly successfully has been afforded. They have not illustrated a reasonably complete construction to meet the problem of flight, nor do they disclose how they should be built to work in a practical way. So far as the published records go, I refer especially to those of this third class, that have never been built or tested. They usually have wings suitable for revolving in one direction, and seem to be sketched and patented more for the purpose of forestalling other invention than for disclosing practical contributions to the state of the art. A disclosure must be quite complete in order to be a valid precedent. A few have revealed faith in these pictures by taking the trouble to build one. Such patents and pictures unless backed up by actual demonstration in flight must be regarded as merely suggestions. They neither disclose nor demonstrate anything of a practical nature, because the elements necessary for their success are missing in their disclosures. They must be regarded, therefore, as neither real contributions to the art; nor deserving of credit in case a subsequent inventor actually supplies the missing practical points and demonstrates the principle. Inventions must be judged by actual performance; they cannot safely be judged from crude sketches and inadequate description. My description omits no essential element or construction necessary to demonstrate the helicopter principle successfully.

After disposing of this third and almost entirely picture class of helicopters, I come to the consideration of the subject of the stability of helicopters in general. Among those versed and skilled in the art of flight, helicopters are generally regarded as impracticable. Their reasoning is not only technical, but is confirmed by the failure of many actual attempts to secure the necessary lift. It is believed that the horsepower required would be too great to make a practical success. Then the general technical belief is, that even if one of these helicopters should be able to demonstrate lift, would still be unstable and at the mercy of the wind in flight. These opinions, regarding helicopters previously disclosed in published writings and Patent Office records, appear to me to be substantially correct. I must therefore depart from such previous constructions. I must supply the missing elements, the missing constructions, and evolve a new method of flight, different from those previously disclosed.

I have given the subject of stability considerable study, and have designed my airplane with devices to maintain the stability of the ship under all circumstances, when using the helicopter principle in flight. For this purpose, I have modified and utilized an old device to attain a new result, namely, I have used the differential gear of the automobile to attain some of this necessary stability of a combined helicopter and airplane in flight. When my airplane is flying as a helicopter, the horizontally revolving wing with propellers might meet a head wind on one-half of the revolution, and be assisted by the head wind on the other half of the revolution. Such a condition would have to be corrected instantly for instability due to rolling. I correct this to a large extent by the differential gear, which immediately slows up the propellers on the side where there is head resistance, and speeds up correspondingly those on the other side where speed is needed. The same differential gear automatically takes care of the resultant wind resistance upon the propellers combined with any cross wind, no matter what its direction may be. In addition to the differential gear, which is automatic in its action, I have provided a smaller lower wing which does not revolve. This lower wing contains ailerons or wing flaps for correcting any instability of rolling, at the will of the pilot. The same ailerons are arranged to correct, at the will of the pilot, any instability due to pitching of the airplane. Such hand control from the joy stick by the pilot has the same directional effect upon the airplane as that formerly attained by the use of both ailerons and elevator. I have minimized the use of both the horizontal tail fin, called a stabilizer, and the elevator usually attached thereto.

I have touched upon longitudinal and lateral stability. There is still another kind of instability that must be corrected, namely yawing. This occurs when the fuselage turns about a vertical axis. A helicopter having a revolving wing has an appreciable tendency to carry the fuselage around with it. To correct this in Patent Office disclosures, inventors have usually shown wings in pairs, one above the other, or side by side. These generally rotate in opposite directions, thus neutralizing the turning movement. Other disclosures pay no attention to such yawing. I discard the method of opposite revolving wings; but I do not ignore the yawing tendency. I select a single revolving wing for the structure disclosed herein. I would simply use two or more revolving wing units with their propellers, when it is expedient to double or triple the power by multiplying some desirable power unit. I use a different kind of turret or monitor, which mounts a single revolving wing, and make a new use of forces acting through a modified form of differential gear. The turret, or monitor, is mounted upon the fuselage in a heat treated and properly ground metal ring. It is necessary to provide strong construction and to reduce the turning friction of the turret movement to a minimum. On this ring run certain ball bearing wheels offering the least possible friction. These wheels are unusual in that the outer races of the ball bearings act as tires for the wheels. The wheels are attached to the tubular members of the turret so as to hold and guide the upper wing. When the wing is turned by motor and upper wing propellers, the effect of the ball bearing wheels on the turret is to guide the upper wing in an accurate path, reducing the turning action upon the fuselage to the minimum. What little turning effect is left, I balance automatically in direct proportion to the power employed by the reaction from the main gears of the differential, acting successively through the engine shaft and engine to prevent a fuselage turning movement about a vertical axis. The differential gear serves a compound purpose. In addition to the purpose already mentioned, it serves to smooth out and make uniform the turning movement that might otherwise be very irregular and difficult to balance. It is difficult to balance friction perfectly, and what imperfections there may be, can be taken care of by the rudder in flight, or by other auxiliary means when the flight is too slow for satisfactory rudder effects.

I have shown in the gear ratios of my differential, different proportions from those used in an automobile. The gear ratios shown are based upon calculations and practical judgment. Such proportions may be further improved upon trial, to attain still more accurate practical balance. At any rate, close balance should be secured in this gear ratio, leaving only such effects as variations in frictional resistance to be balanced by the rudder or other auxiliary means. The difficulty of torque balance of the upper wing propellers in variable winds without the use of differential gears, and the difficulty of balancing the unstable yawing of the fuselage about a vertical axis, are obstacles sufficient to have deterred some of those, who sketched the forms of early helicopters, from attempting to make a demonstration in flight. I have turned both these obstacles into useful mechanical and aerodynamic effects, obtained co-ordinately and almost automatically by the construction.

The difficulties of explaining a new invention are very great. One naturally seeks simple statements to make radical changes in construction clear. The present-day airplane, with a single air-cooled engine located in the nose of the fuselage and direct-connected to a tractor propeller, is perhaps the simplest and lighest installation for a power plant. Such location is so favorably regarded that it has become well nigh standard practice for single motored airplanes. Nevertheless, for commercial purposes it has many inherent disadvantages. A few are mentioned as follows: (1) interference with the pilot's vision, (2) engine weight too far from the center of gravity and too far from the center of buoyancy of the airplane, thus requiring balancing its whole weight, (3) the nose of the airplane is certainly a poor place to set up engine vibrations in operation, when such vibrations are communicated to an overhanging support and thence to the whole ship, (4) the air-cooled engine in the nose of an airplane with its rambling exhaust pipes offers considerable air resistance. It presents an unsightly appearance that does not compare favorably with an air-cooled engine installed as illustrated in the drawings herewith.

You will note that these are commercial and engineering objections. There are still other objections. The present air-cooled engine in the nose depends for its cooling primarily upon its speed and the temperature of the air. It is an imperfect arrangement. Such an engine is at a disadvantage when being tested on the ground, and when subjected to variations of air temperature from below zero to over 100 degrees, Fahrenheit, with no simple means available for temperature control of the outdoor air. It is, however, a difficult matter to air-cool the round cylindrical forms of engine cylinders by other means. Cylinder heads naturally do not have stream lines, and the part of the cylinder cooling on the wake side of the air stream presents a different kind of friction relative to the air stream.

The nose engine and propeller, make a still more disadvantageous engineering arrangement in comparison with mine; when the nose engine idea has to be multiplied in a larger airplane of the tri-motor type requiring the addition of two more engines with separate fuselages, called nacelles, out on the wings. These additional nacelles provide a nose, and enable stream lining each additional engine. The above are sufficient to indicate a few of the simple disadvantages of the air-cooled engine installed in the nose, that I wish to correct. There are other more complicated disadvantages, such as having the nose engine close to the pilot's instrument board, magnetic compass, or earth inductor compass instruments and controls, or near the pilot's wireless equipment.

For these reasons and others, I have rejected present practice of a nose location for powering a single engined airplane, and instead locate the engine as near as possible to the center of gravity and center of buoyancy of the airplane in flight. I then place my main shaft in a vertical position after the manner of helicopters. Such a location achieves the result of not requiring balancing the weight of the engine to secure longitudinal stability. In this central position I attain the advantage of locating gasoline tanks on either side at the center of buoyancy, thus automatically balancing a diminishing fuel supply at, or close to, the center of gravity and center of buoyancy. Centrally locating the motor has many structural advantages. It minimizes the possibility of transmitting and multiplying any unbalanced vibrations that may come from the motor to the fuselage. Another advantage is that the mass and the revolutions of the motor have a better combined balancing and gyroscopic influence on the airplane stability in flight. By moving the airplane engine from the nose to the central part of the ship and placing the shaft in a vertical position, I attain several other objects incident to the new location. Of these may be mentioned greater accessibility of the motor, better protection of the engine, facility to warm the airplane from the engine compartment, etc.

By locating the single motor at the midship section, I achieve also unobstructed view from the forward cabin, remove the engine a good distance from the instrument board, the magnetic compass, earth inductor compass, wireless dials, instruments, etc., all of which may be placed in the nose to advantage. The nose location may be an improvement over an engine high up at the back of a pilot; but it certainly does not compare favorably with an engine located low down in the midship section of the fuselage, directly over the landing gear.

In changing the location of the engine, I also change the position of the engine shaft from horizontal to vertical, and remove the air-cooled engine from what has hitherto been regarded as its rightful position in established practice. The fact is generally, that such old location is regarded almost as an aerodynamic necessity.

To accomplish all the results enumerated above in changing the location of the air-cooled engine, it was necessary, besides making minor changes in standard engine fittings, to devise a practical method of cooling an engine having circumferential fins on the cylinders; and to do this with a considerable saving in engine power in comparison with the present method resulting from letting the engine cylinders stick out into the air stream, when the airplane is in flight. I am compelled to cool the motor when my machine is operated on the helicopter principle, and when there is no considerable forward flight motion. So I saw that dependence upon air-cooling in flight was of little use on a long, nearly vertical lift. I therefore decided to cool the engine with a fan and base the cooling on the number of revolutions of the engine, whether in the shop, in the air, or in the airplane upon the ground. Assuming the same average difference in temperature, the cooling effect produced in cooling the cylinders of the engine is in proportion to the frictional resistance of the air upon the engine cylinders and cooling fins. I know this from my experience and tests in heat transmission with air in various kinds of heating and ventilating equipment. I therefore knew that if I could cool the engine cylinders in a more scientific way than just letting them stick out into the air stream, I would probably use considerably less power than is at present lost in "the drag" caused by driving the exposed cylinders through the air. By designing a fan well suited to the work, I could get it into the space allowed, and key it directly upon the engine shaft; achieving the compound purpose of cooling and giving the engine smoothness of operation, superior to a flywheel having only the weight of the fan.

I have touched upon the disadvantage of wide variations in the temperature of air used in cooling engines located in the nose of airplanes. In the midship location of the motor it is possible, by arranging openings with dampers between fresh air inlet connection and the engine compartment, to recirculate some of the air used for cooling the engine cylinders in cold weather. This achieves more uniform temperature, materially limiting the range of variation in the temperature of the cooling medium. It is also possible by means of automatic temperature control, to make such a system automatic in its operation, similar to the operation of winterfront shutters on automobile radiators. Housing the whole aircooled engine in a compartment is of great utility for starting the engine in extremely cold weather.

It has been shown, therefore, that position of the air-cooled engine, is not merely a matter of location, but a matter of possible results in successful airplane practise. I know that engines have been located in almost every conceivable position in aircraft; but they have not been used as described in an airplane or in a combination helicopter and airplane. The design shown herein possesses the advantage of the utmost concentration of weight and flying surfaces to insure stability. It is therefore necessary to take all the factors of design, including weight distribution, aerodynamic balance, and stability, into consideration; to judge whether two ideas of engine location and the results accomplished are at all similar.

This brings me to the subject of the compound function to be performed by my aircraft. It must have the helicopter principle for "taking off" and landing; at the same time it must fly like a power driven airplane. It would seem difficult enough to achieve this duel purpose of converting one and the same airplane into these two hitherto different types. But in order to be of practical service, one must be able to shift from the helicopter principle to the airplane principle in flight, and vice versa. There is no published record of this having been done; and no published disclosure, that I know of, that reveals its possible accomplishment.

I worked on this point until I was about ready to abandon it as impossible. I knew it had to be done in order to take off in a small space, and that someone would have to do it. At first I had the crude idea that the upper wing working on the helicopter principle could revolve continuously to maintain altitude, and that a nose propeller in the fuselage could be used to attain speed by varying the pitch of the propellers. The pitch of a propeller is roughly defined as its advance per revolution. I tried my best to obtain a propeller whose pitch could be varied in flight at will. The best that was obtainable did not meet my purpose. I was looking not only for one whose pitch might be varied in flight, from full speed to reverse, with engine turning in only one direction; but also for one that would indicate its relative setting at all times to the pilot.

Being unable to obtain such an article as an indicating variable pitch propeller, I set about to invent the missing article, achieving for this purpose a wholly unexpected success. It satisfied every condition which I had laid down and more too. This propeller amounts to a separate invention. It does all that I expected of a variable pitch propeller. It has the added features of being a sectional type, in which one may change the blades to those of different diameter or shape, and change the range of pitch. Furthermore, I can use the standardized hub to mount propeller blades in the ordinary manner for giving the blades any fixed adjustment on the ground. Such partial adjustment is called "semi-adjustable", because it is not adjustable in flight.

By solving the problem of a variable pitch propeller, I found the key to the more difficult undertaking of making the same flying machine serve alternately as a helicopter and as an airplane. In straight flight the present-day airplane has proven itself a marvelous speed vehicle. I thought if I could only "take off" with rapid lift as a helicopter, and then shift to a straight-flight airplane in the air, the problem would be solved. When working as a helicopter, the upper wing turns about a vertical axis, so that the right and left hand wing continually lose their designation. Therefore, in designating, I have to assume the upper wing to lie at right angles to axis of fuselage, and that the pilot is in his position in the airplane. Then, that portion of the upper wing on his right hand has a pair of propellers which have a fixed pitch and turn only in one direction,—forward. That right hand portion of the upper wing will always be designated as the upper right wing. The portion of the upper wing on his left hand has a pair of propellers which likewise turn in only one direction, but they have a variable adjustable pitch. The pitch may be varied from full pitch ahead to full pitch reverse. That portion of the upper wing having the variable pitch propellers will always be designated as the left upper wing.

To speed the story, I knew that whereas the helicopter principle was all right for low speeds, it was a thing to be avoided for high speeds, in which field the gliding airplane has demonstrated its matchless supremacy. I tried, therefore, to devise means to check the revolution of my big upper helicopter wing at the will of the pilot. It must be done quickly and gently, as if maneuvered by a bird, without the slightest jar or jolt. I felt that any sudden stop would be risky and unsatisfactory.

Having solved the propeller problem for the fuselage, I now set about to stop the big wing by reversing the propellers on the upper left wing, or rather to shift them from the reversing position associated with my helicopter idea to a "straight-ahead-flight" airplane position. Discarding all other suggestions, I decided, from twenty odd years experience with automatic controls, that the best practical method of getting controls to work from the pilot's feet, up through the revolving turret, was by the use of compressed air. That was not all. A high speed engine shaft ran up through the center of the turret. I had to get compressed air from the pilot's foot button to a cylinder, in the upper left wing, to shift the pitch of its propellers, while the big wing is in rotation, so as to automatically center the wing. I devised a new rotary valve gear from my experience as a valve gear designer.

Someone might argue that this is all right as a matter of theory. Must human life be risked to prove it? That question has already been answered with a fair amount of thoroughness by the design itself. With the "fan cooled" idea for the engine, the airplane may be tested while the airplane is fastened to the ground, or secured to a platform of moderate height. It thus becomes possible to revolve the helicopter wing to measure the lifting power exerted and, after recording results, to shift the pitch of the upper left wing propellers and "center the wing" automatically. By seeing how quickly the movement is executed, and noting its action upon the rest of the plane, a fair estimate can be made of what it will do in the air. The upper wing might then be revolved again as a helicopter, etc. By repeating these operations dozens of times on the ground, in all kinds of wind, both with fuselage fastened and with fuselage partly free, a good pilot will be able to anticipate what to expect in the air.

Since the most difficult shift is from the helicopter idea to the straight-ahead type of airplane flight, it is important to be sure that such an evolution can be executed quickly and positively, to insure correct execution in the air. Given the necessary height, a good pilot can quickly maneuver a plane out of almost any position, provided the plane has the fundamental qualities of good design with inherent stability.

The compressed air controls effect new and surprising aerodynamic results, which I believe are original. They are arranged to produce these effects in maneuvering an airplane in flight. Among these results may be mentioned: first, the reversing of one pair of propellers in the helicopter so as to rotate the big helicopter wing; second, the automatic centering and stopping of the rotating helicopter wing; third, the steering of the airplane in straight flight by automatically altering the speed of right or left propellers in upper wing at the will of the pilot; fourth, the automatic holding and releasing of the airplane turret in harmony with the first and second results enumerated above.

Before leaving the subject of compressed air controls it may be stated that as far as practicable, the general principle has been followed of using compressed air momentarily only, as for example in centering the helicopter wing. As soon as the movement is completed and the wing properly centered, no more compressed air is required. In general, the compressed air comes preferably from a small air compressor direct-connected to the airplane engine. Such compressed air supplies air to a compressed air storage tank for the purpose of starting the engine. The compressed air engine starter is the invention of another. With that installation, however, there is usually a surplus of compressed air, which can be discharged into a separate lower pressure air storage tank for other compressed air purposes enumerated above. A small auxiliary air compressor connected in any suitable manner to existing shafts will serve to act as a supplementary unit for compressing air for supplying lower pressure air, or will serve as a primary unit for the same purpose.

The form of the upper, or helicopter wing, is an aerofoil tapering in vertical section and in plan. It has a symmetrical form for combining the double purpose of straight gliding flight, and serving as a revolving wing. The cross section of the wing may be either of symmetrical airfoil form; or by proper tilting of the turret for adjusting the wing incidence, certain unsymmetrical airfoil forms capable of higher efficiency in straight flight may be used. The lower wing is smaller and serves an additional purpose of steadying the whole plane, especially at low speed when the helicopter method of flight is in use. The lower wing serves to pivot the ailerons, having a twofold function of acting as both ailerons and "elevators". How this is done will be explained further on. Combining ailerons and elevators, not only saves weight and simplifies the structure; but also increases the safety of the plane against nose dives, tail spins or other unstable attitudes of flight, by minimizing the "tail-plane" structure.

The marked "sweep-back" to the lower wings, their general shape, and the relative area of the ailerons were made to my approval. The idea of minimizing the tail stabilizer and elevator was my own. I would, however, have hesitated to adopt it without confirmation by an aviator assisting me in the design.

The idea of making the ailerons serve the double function of ailerons and elevators, controlled by a single stick, was original with me and may be patentable. It is illustrated in these drawings as an important feature in the control of the airplane. It is backed up by the applicant's experience in designing combined steam and hand steering gear for steam vessels.

Something should be said to explain the use of so many shafts, propellers, and even gears in the structure shown. It is evident that they possess the disadvantage of weight unless they serve useful purposes unattainable without them.

In regard to gears, they are used successfully in all classes of automobiles. Reduction gears, however, have been used rather thoughtlessly in airplanes. It must be borne in mind, that neither the airplane engine, nor the automobile engine, is capable of turning with sufficient smoothness, without a flywheel, to insure a safe use of gear wheels. In my design, I have provided the airplane engine with a cooling fan serving also the purpose of a flywheel; and I have augmented this by adding a heavy outside rim to the fan, getting the effect of a much heavier flywheel with the minimum weight. Under such conditions, gear wheels should run smoothly and safely, when driving the balanced loads of propellers in flight. The gears serve to distribute the engine power, and enable one to select gear ratios for the propeller speeds best adapted to purpose they serve.

With my central plant, I distribute almost immediately the engine power in three directions,—to the upper wing propellers, to the nose, and to the tail propellers. This distribution of power makes a wide distribution of stresses on the gear teeth and enables one to design them safe, thereby attaining smoother running conditions than in an automobile. Ball bearings are used throughout on all line shafts and gear boxes, so as to reduce power transmission losses to a minimum. To anyone who is familiar with the scientific use of gears, a careful study of the gears will reveal the fact that the whole gear transmission system is not an ordinary system of distribution; but that it is arranged with unusual thoroughness for efficiency. Gears have been placed to balance each other for side and end thrust. For example, axial thrusts of bevel gears are offset by the axial thrusts of propellers.

The wisdom of using many propellers on this single engine airplane is apt to puzzle the airplane engineer, who has been schooled to measure advantages too much by weight alone. I am sure that I use primarily a different method, different principle of design, because this ultimates in a different result. The first postulate in my method, or principle, is that where it is a question of safety, as in commercial airplanes, such matters as weight and speed must be given little or no consideration until safety is achieved. It isn't merely a matter of "safety first" in an airplane. It must be a matter of "safety at any price" in the mind of the designer. I therefore throw the argument of weight to the four winds to obtain safety at any price. When a new result is achieved, that result furnishes a passport for its accompanying weight.

Now let us see how this principle works out. The safety of an airplane is dependent primarily upon its stability. This stability is largely a matter of balance. Every airplane in flight is, and must be, balanced to continue to fly a given course in stable equilibrium. The combined lift and other forces of the atmosphere, upon the airplane surfaces, must balance in position and magnitude the positions and weights of the airplane itself. Two different types, like the monoplane and biplane, while in flight may be in stable equilibrium, i. e. both may be balanced accurately by their pilots; but they may differ greatly in what may be called inherent or natural stability. To put it in plain language, they may differ greatly in inherent balance. The plane having the greater natural balance, will require less departure of the control surfaces from the normal to maintain stable flight. As mentioned, it was to obtain a larger measure of this natural balance under various loadings, that I located my aircooled motor in its peculiar amidship position. Now there is another kind of natural balance that I believe has a great deal to do with the safety and stability of an airplane, affecting its natural balance in flight. It isn't an easy factor to grasp. It is the fact that the airplane propeller itself takes a certain hold upon the airstream which it sets up; and that a number of propellers properly distributed and balanced, as regards turning movements, will effect greater steadiness and stability in the air. I have therefore balanced my propeller turning movements, balanced my airstreams, and am ready to take the consequences as regards additional weight or loss of speed, if there are any. I make the plane safe and maneuverable at any cost. I deliberately use six propellers on a single engine airplane. It is perfectly feasible to get along with only two propellers, one on each hand of the upper wing and perhaps one more propeller at the tail; but I deliberately double these to balance the distribution, and undoubtedly lose a little in propeller efficiency to obtain better natural balance and increased safety. It is also known, that the present-day airplane with a propeller in the nose, loses something in efficiency by the natural tendency of the airplane to turn out of a true course. Such tendency must be corrected by control surfaces.

The use of many propellers, with a single engine airplane, to help balance may be likened in a crude way to the balance of a road vehicle, if one does not carry the analogy too far, since a road vehicle moves in only one plane. If the road vehicle has only one wheel, called a unicycle, it is a difficult thing to balance. If it has two wheels alike, we have the safety bicycle, which is much easier to balance. If it has three wheels, called a tricycle, it is still easier to balance. If it has four wheels, like an automobile, the stability at high speed and in making turns, requires less of a driver's skill in motion. Of course wheels of a vehicle are definite points of contact with the ground. Propeller wheels in motion are points of contact that the engine makes with the sustaining air.

The mechanical principle underlying my arrangement of multi-propellers with a single engine, is that propellers in the nose, tail, and far out from the center of the upper wing, effect a better flying balance and distribution of power, thus achieving increased stability in flight. Having concentrated the principal weights, I now speed my revolving surfaces for greater stability. Such increase in stability is not so great as to be too rigid, thus interfering with the flying controls. Of course wing surface and airspeed are the primary means of sustentation. The balance is a comparatively small factor. Every force and its position are essential elements in the flight balance.

It should be mentioned that it is possible to successfully modify my construction, using the combined principle of the helicopter and airplane, as for example by omitting the horizontal shafts in the fuselage, including the omission of the nose and tail propellers. This would possess certain advantages as a seaplane, since it would eliminate the propellers near the surface of the water. Other changes would need to be made which need not be enumerated.

A more interesting modification of my construction would be a multi-engine airplane, as for example a tri-motored plane using the mechanical principles described herein. A tri-motored plane is usually a larger and heavier machine. In such a tri-motored plane the power requirements would be such as to make it desirable to put a large motor in the amidship position, as shown in the accompanying drawings, using my same arrangement of wings and the helicopter principle, while the two horizontal shafts and gears could be replaced by one smaller aircooled engine and tractor propeller in the nose, and a duplicate small aircooled engine with pusher propeller installed in the tail. Likewise, the large amidship engine could be combined with a separate aircooled engine located in the nose. Of these I will discuss just the tri-motor type, since its balance would be self-evident and because it well illustrates the advantage of my type of construction.

In such a tri-motor arrangement, all engines would, in plan, be in line with the longitudinal axis of the plane. Such arrangement would have the outstanding advantage over existing athwartship arrangement of three motors, in being able to fly as an ordinary airplane with any two of its engines running, without producing a tendency to turn to the right or to the left. Even if only one of the three engines were available in an emergency, it could be used to assist in flying, or gliding, a long distance to a safe landing. There would be no tendency to turn the plane to the right or to the left, as would be the case where the only available engine of the three happened to be one of those installed out on a wing. As a matter of safety engineering, the ordinary tri-motored ship does not compare at all favorably with such motors in line as I have mentioned herein. I would in general only use three motors in preference to two, where that much more power could be obtained in no other satisfactory way.

A useful and novel safety device will now be described. Assume the following problem. When "taking-off" from the ground, and using the helicopter principle of the revolving wing, there is a contingency which must be provided for of a single engine going dead, for example when fifty feet off the ground. With the engine rigidly connected to the vertical shaft and stopping suddenly, it might stop the upper wing in an awkward position, and there would hardly be time to "automatically center" the upper wing so close to the ground, even when provided with my compressed air controls without the safety device,—a flexible ratchet coupling. With the large upper wing held by the engine in an awkward position, the upper wing might prevent the lower wing and control surfaces from making a clean glide to the ground. I believe I have successfully solved that problem. Another condition that incidentally required solution was that there should be some kind of a flexible coupling in the vertical shaft where it enters the turret or monitor; first, on account of attaining some flexibility in this member, and second, because I wished to be able to make a tilting adjustment on the ground for the turret, so as to secure as much as three degrees incidence plus or minus for the revolving wing. Such adjustment is deemed advisable for practical expediency in building a new type of aircraft. Again, I found the solution in a device capable of performing two functions; a flexible coupling, and an automatic safety device, in the form of a multiple pawl ratchet. I call this device a "flexible ratchet coupling". Should the engine suddenly stall when fifty feet above the ground, the upper wing and propellers would continue to revolve by their momentum, unrestrained, thus enabling a safe glide to the ground. This is a very simple device, but its merit is not fully appreciated until it is further pointed out that other features of the design are not interfered with. The upper wing can be "centered" automatically without interference from the "flexible ratchet coupling". It is not an easy point to see, in spite of the fact that the device is so simple. After I had worked it out, it took me quite a long time to be convinced that it would actually work without interfering with other necessary mechanical functions.

I have pointed out how I have made safety the principal thing, but notice the demand of this principle. One idea that needed to be carried out, was to be able to actually stop the airplane in the air, as one reverses the engines of a steamship or puts on the brakes of an automobile in the case of an emergency. It would be foolhardy for a pilot to attempt to do a thing like that in still air with present-day airplanes. Yet the same principle that makes for safety in the automobile, the railroad, and the steamship, must be available to the airplane in full flight. It is almost equally important that the airplane at high speed may be able to swerve more quickly to right or left, to avoid a suddenly appearing obstruction, thus requiring greater maneuverability. At this point I will only state that I have provided my airplane with these safety qualifications.

When flying as a present-day airplane in straight flight, I can as quickly as may be advisable, reverse my propellers in the upper left wing, causing the upper wing to revolve and, at the same time, actually reduce the pitch and gradually reverse my nose and tail propellers about as one would reverse the engines of a small steam vessel. More knowledge and especially practice in doing this is desirable; but I have provided the means of doing it. Flying as an ordinary airplane, it is feasible with my compressed air controls and the differential gear to steer and maneuver with my wing propellers so as to make sharp turns to the right or to the left. Large dragon flies execute this quick stop in the air. I have seen them make sharp and rapid turns that to the eye looked like right angle turns. So it must be feasible even though I do not use the same means.

Within the scope of this invention, it is obvious that further modified forms of aircraft, or details, described herein may be constructed; but involving the same underlying mechanical or aerodynamic principles without my attempting to further set forth its various possibilities. In the accompanying drawings I have shown only one practical form of such aircraft illustrating the principle of my invention, which I expect to demonstrate in actual flight. Other forms, or even changes, may be employed without departing from its scope. The matter contained in the description and drawings must be specific in order to be useful as a complete disclosure of the invention, and such specific disclosure must be interpreted as illustrative and must not be interpreted in a limiting sense.

Of course it is implied that any other necessary or important apparatus, instruments, and such equipment known as accessories must be regarded as being present to make my description complete, practical, and operative; so that no technicality of inoperativeness may be raised. Having defined the principle, objects, and advantages underlying this method of flight, other objects and advantages will become apparent as the apparatus and method are described.

Fig. 1 is a three-quarter general view of the airplane in flight, the six propellers being shown in revolution. The upper wing may be regarded either as being held stationary after the manner of the present-day airplane in straight flight, or the upper wing may be regarded as revolving like a helicopter, the wing being pictured at the moment when the upper wing happened to be at right angles to the airplane body or fuselage. In this Fig. 1, the airplane is pictured as if it were about to fly over ones left shoulder.

Figs. 1a, 1b, 1c, and 1d make up a serial drawing showing my combined airplane and helicopter in flight. The aircraft is purposely enlarged out of proportion to the rest of the picture for showing relative wing positions, propellers, etc. This serial illustrates in diagrammatic form, a few simple maneuvers of my flight method. In the lower left hand corner of 1a, the aircraft takes off as a helicopter. The path of the helicopter method is indicated thus ———————; whereas flight as an airplane is indicated thus + + + + + + throughout. From the right hand of Fig. 1a, the flight continues across the sheet continuing to the left hand portion of Fig. 1b across the sheet etc., until the machine comes to rest as a helicopter beside the hanger in the lower right hand of Fig. 1d.

Figure 1:
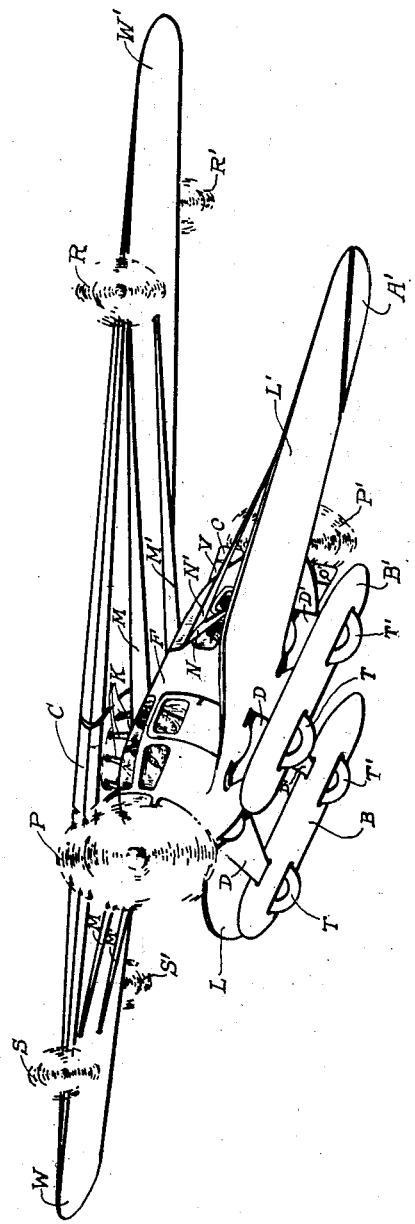
Fig. 1e is a small detached figure in the upper right hand corner of Fig. 1a. It shows with a series of dashes, three possible paths of flight, when taking off as a helicopter from the roof of a building.
Figure 1C:
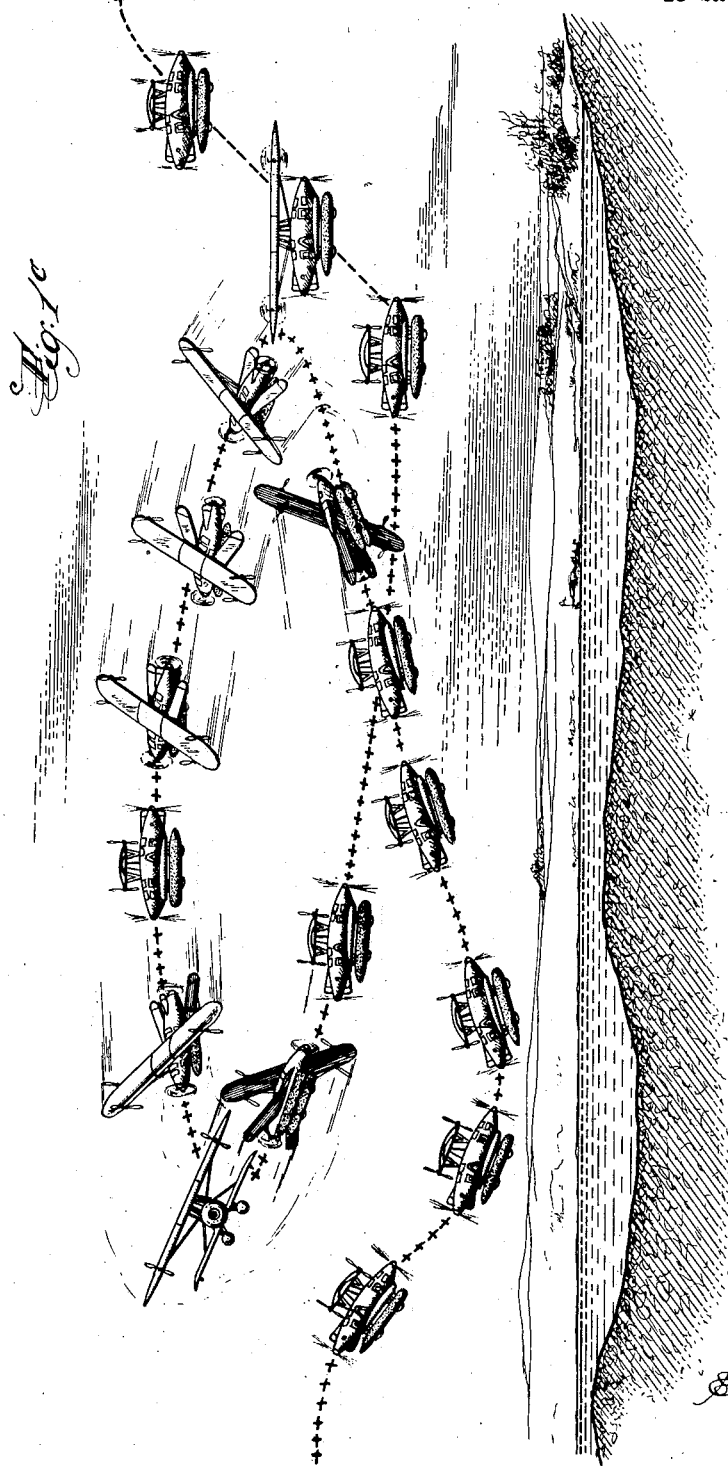

Fig. 6 is an enlarged sectional elevation drawn to scale, showing a longitudinal section taken approximately down through the center of the airplane, when the revolving upper wing happens to be in line with the fuselage. The section is taken in a manner to expose to view the apparatus which I desire to illustrate, such as the engine, a pilot in position at the left, and obstensibly a passenger at the right in the rear cabin. The upper wing is also shown mostly in section and partly broken on account of the limitations imposed by the size of the sheet. There is room for two passengers, side by side; and likewise two pilots, side by side, for purposes of instruction, or a long journey.

Fig. 7 is a fragmentary view of the sheet metal casing surrounding the engine cylinders and connected with the cooling fan. Such casing serves to direct the air blast from the fan closely around the engine cylinders.

Fig. 7a shows an enlarged longitudinal fragmentary section of an engine cylinder wall, with typical cooling ribs and sheet metal air casing.

Fig. 8 shows an enlarged sectional view of the hexagonal revolving frame, or turret, and its track with certain other parts shown, partly in external view and partly broken, in order to afford illustration of the vital part of the construction. This view is taken from the passenger cabin looking forward, when the big upper wing is held fixed in its normal central position suitable for forward gliding flight, or it may be assumed to be pictured in rotation at that particular point, when using the helicopter principle of flight.

Fig. 9 is a fragmentary view of a vertical section at the circular track, upon which the revolving turret turns, drawn to a larger scale than Fig. 8 above, in order to show details of the roller bearing wheels, and a somewhat better detail of one of the adjusting bolts, that will be explained later. The section is taken at X—X in Fig. 12.

Fig. 10 is an enlarged view of the "flexible ratchet coupling" shown in position in Fig. 8. Fig. 10 is shown half in external view and half in section.

Fig. 11 shows the top view of Fig. 10, partly in external view and partly in section.

Fig. 12 shows a fragmentary plan view of the spider-like frame in the lower portion of the turret, including the circular track on which the turret revolves. The circular track is broken so as to better show the roller bearing wheels etc., in their correct relative position. On the left hand side of Fig. 12 is shown additional bracing, which is another portion of a complete hexagon, and which has been broken in order not to obscure other parts. Two wing struts are also shown with their fastenings at the left of this view in fragmentary form.

Fig. 13 is a fragmentary sectional view taken at one of the twelve rubber diaphragm air motors, for compressing the spring holding the various friction brakes engaging the circular turret track. The sectional view is taken along the line Y—Y in Fig. 12 on same sheet.

Fig. 14 is a fragmentary sectional top view on the line, a—a, taken near the axis of the spring bolt of the diaphragm air motor shown in Fig. 13. Fig. 13a is a section of Fig. 13 on the line, b—b.

Figure 15:
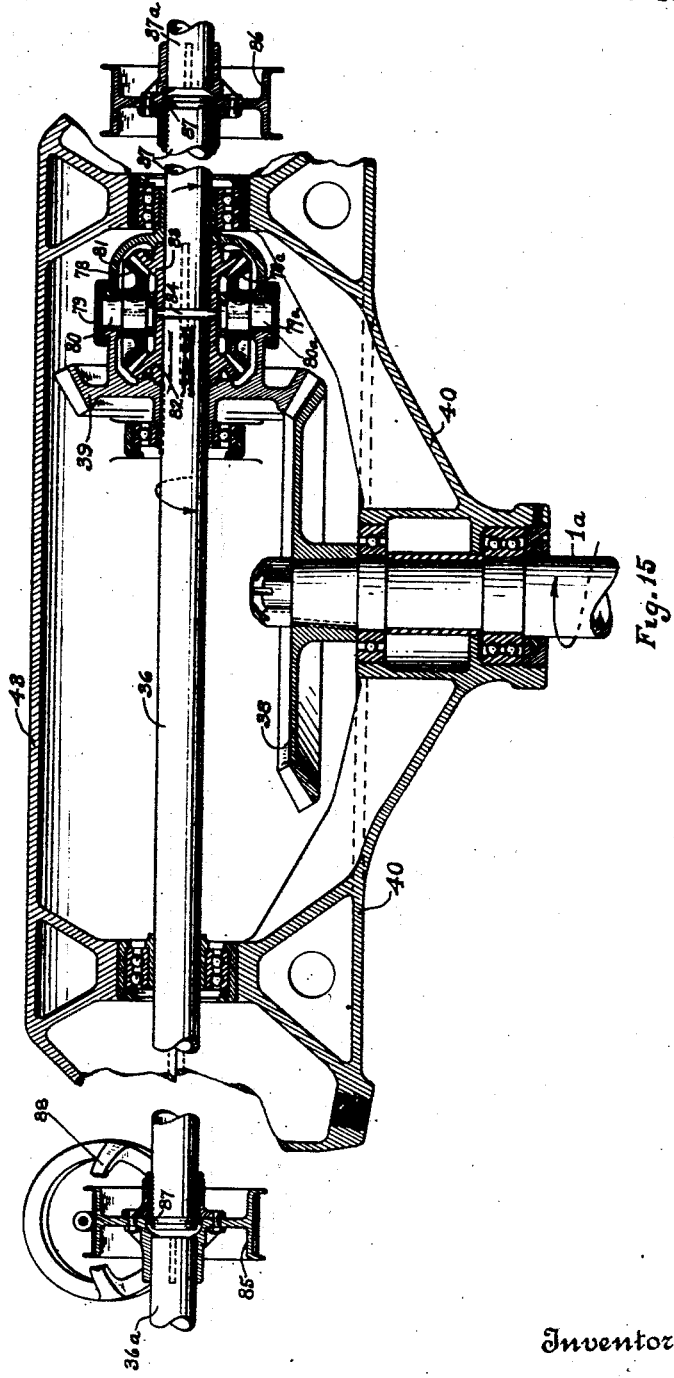

Fig. 15 is an enlarged sectional elevation of the upper part of the revolving turret shown in Figs. 6 and 8. When the upper wing is in the normal position at right angles to the fuselage; Fig. 15 shows this sectional view when standing at the rudder end and looking forward.

Fig. 16 shows an enlarged detail of one of the two shaft fittings placed one on one side and the other on the other side of the upper wing. It is a combined shaft coupling, brake drum and diaphragm air motor, with brake band for applying pressure upon the drum by means of the brake band shown. The lower portion of Fig. 16 is a sectional view, and the upper portion an external view. Their location is accurately shown on Fig. 6.

Fig. 17 is a side view of Fig. 16 shown partly in section. Fig. 17a is a fragmentary sectional top view of Fig. 17, taken on the line, $c$—$c$.

Fig. 18 is a cross sectional detail of a nest of six rotary valves, whose inside finely hatched portions revolve slowly with the turret; but the outside portions are held stationary with respect to the fuselage, enabling suitable connections of various air pipes and for firmly connecting the outside portions to the fuselage. The cross section of this valve gear is taken athwartship, when the big upper wing is in its normal central position at right angles to the fuselage, suitable for straight-ahead flight. The cross section is shown as it would appear when looking straight forward from the rear cabin. This valve gear is shown in position in Fig. 6 and in Fig. 8.

Fig. 19 is an outside top view of the rotary valve gear shown in Fig. 18. The upper stationary part of Fig. 19 points forward, and the lower part points aft in the fuselage. The top valve in the nest, and certain connections to the nest of valves, is shown.

Fig. 20 is a top view of a cross section on the line, $a$—$a$, Fig. 18, of the second one down of the nest of six rotary valves. Its function, when supplied with compressed air by the pilot, is to "reverse upper left wing propellers".

Fig. 21 is a top view of a cross section on the line, $b$—$b$, of the third one down in the nest of six rotary valves shown in Fig. 18. Its function when supplied with compressed air by the pilot is to act as the "right wing propeller brake" for slowing down the right wing propellers.

Fig. 22 is a top view of a cross section on the line, $c$—$c$, of the fourth one down in the nest of six rotary valves shown in Fig. 18. Its function when supplied with compressed air by the pilot is to act as the "left wing propeller brake" for slowing down the left wing propellers.

Figs. 23 and 24 are top views of a cross section on the lines, $d$—$d$ and $e$—$e$, respectively of the fifth and sixth valves down in the nest of six rotary valves shown in Fig. 18. Their function, when both are supplied with compressed air through the foot control valve by the pilot, is to "center the upper rotary wing" of the airplane by automatically controlling the left and right wing propellers respectively.

Figure 2:
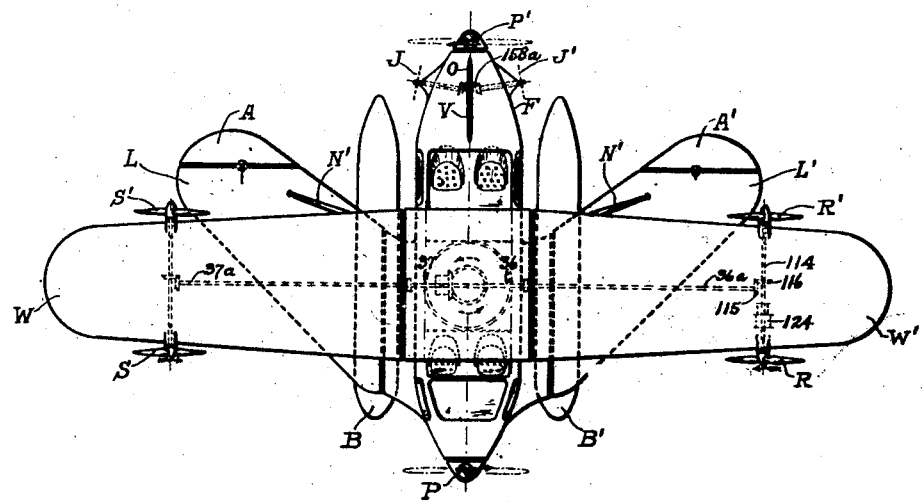
Fig. 2 is an outside plan view looking down upon the airplane from above, with the nose of the plane pointing towards the bottom of the page, and the upper wing in fixed position at right angles to the fuselage.
Figure 4:
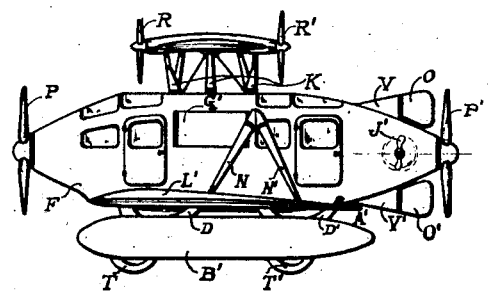
Fig. 4 is the corresponding side elevation of the airplane shown in Fig. 2.
Figure 5:
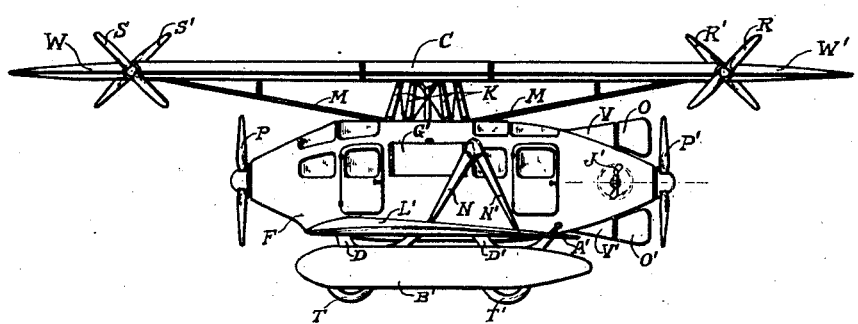
Fig. 5 is the side elevation of the airplane shown in Fig. 2, except that the long upper wing is not fixed in position but may be regarded as being in revolution, and is pictured at the moment when this long upper wing happens to be in line with the fuselage.

In Figs. 20 to 24, all these rotary valves are shown in their individual relative position when superimposed upon each other, corresponding with the top view in Fig. 19, with upper wing in its normal mid-position shown in Figs. 2 and 4. In other words, the upper part of these figures, 20 to 24, all point forward in the fuselage, and the lower part points aft. If any other function is needed to be performed in the upper wing, it can be done by adding another valve on top of the six already shown, or by altering their duties.

Fig. 25 is a partial outside view of a divided bevel gear box, with the upper half removed, located in the left upper wing. It shows bevel gears etc., in section, and an air cylinder in section for reversing the propellers in the upper left hand wing. The upper half of the gear box and the upper half of what I call the crosshead box are removed in this view. At the right hand side of this figure is shown Fig. 25a the continuation of the shaft and shaft casing, in broken view.

Fig. 26 shows an enlarged view of the crosshead box referred to in Fig. 25. This crosshead box is shown in broken view so as to show the collar of the hollow shaft and the longitudinal slots in the hollow shaft. The crosshead itself is shown dotted. This crosshead is fastened into the innermost solid shaft serving as an actuating rod for changing the pitch of the propeller blades.

Fig. 27 shows a corresponding section of this crosshead and crosshead box shown in Fig. 26, taken on the line $f$—$f$.

Fig. 28 shows a dual control diagram with two joy sticks, by which either of two pilots may manipulate the flying controls of rudder, rudder auxiliaries, or right and left hand ailerons,—the latter serving also as elevators.

Fig. 29 shows a fragmentary detail of a portion of the dual controls between the two joy sticks.

Fig. 30 is a side view of Fig. 29.

Fig. 30a is an enlarged isometric detail of an assembled fitting having two pairs of control fingers engaging the internal pitch shifting rods of auxiliary rudder propellers. The double rack meshes with gears, fastened to, and moving with the rudder post in Fig. 28.

Figures 31, 32:
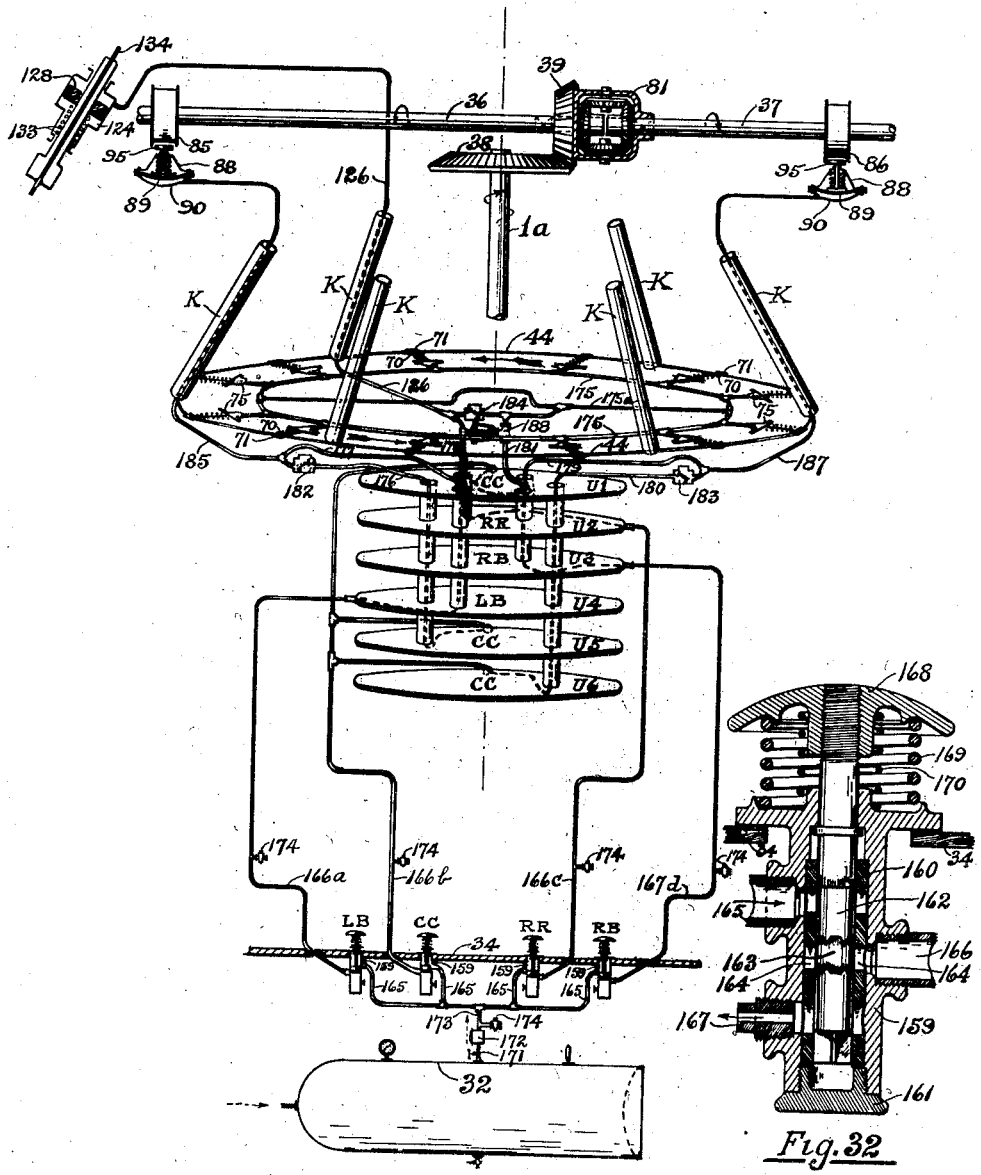

Fig. 31 is a diagram of the compressed air controls actuated by the pilot's feet.

Fig. 32 is a sectional view of one of the four compressed air valves, shown in Fig. 31, suitable for foot control by the pilot.

Fig. 33 is a sectional view of my variable and reversible pitch propeller. The blades of the propeller are shown broken off at the shank.

Fig. 33a is a fragmentary cross section of a portion of the propeller blade root showing key in full view.

Fig. 33b is a cross section at one of the gear hubs on the line z—z, Fig. 33.

Fig. 34 is a top view of the propeller shown in Fig. 33. The upper half of this top view is an outside view. The lower half of Fig. 34 shows a half section of the propeller at the line, m—m, Fig. 33.

Fig. 35 is a side view of Fig. 33 from the left, with the hub cap removed and the hollow hub broken away, so as to show the working parts of the variable pitch mechanism.

Fig. 35a is simply a sketch to indicate the adaptability of the propeller construction to propellers of more than two blades.

Fig. 35b shows sectional detail of stub gear teeth shown in Fig. 35.

Fig. 36 is a fragmentary view showing nose propeller of the airplane, a broken section of its hollow shaft, and a hand wheel for moving a control mechanism, which shifts the controlling rod longitudinally in the hollow shaft. The control mechanism has an index and scale for indicating the exact pitch of the propeller. The symmetrical portion at the right of this view is merely to indicate how the blades of the tail propeller are shifted co-ordinately with the blades of the nose propeller. The mechanism is shown with the nose propeller approximately in its neutral position, thus furnishing no propulsive effect.

Fig. 36a is an enlarged detail of handwheel and propeller pitch indicator, shown in Fig. 36.

Having stated what each figure represents, I will now go into more detail to designate the various parts. Similar characters, letters, or numbers will designate similar parts in different figures.

In Figs. 1, 2, 3, 4, 5 and 6 similar parts of the aircraft are designated as follows: F is the fuselage or body, P and P' are the nose and tail propellers respectively. Both nose and tail propellers are capable of being reversed at will by the pilot. C is the central portion of the upper wing. W and W' are symmetrical portions of the upper right wing and upper left wing respectively, as one would speak of the right wing and left wing of a bird. S and S' are the propellers on the airplane's upper right wing W; while R and R' are the reversible propellers on the airplane's upper left wing W'.

Of the six propellers mentioned herein, the pair belonging to the fuselage and the pair belonging to the upper left wing have the mechanism for pitch adjustment and reversibility. The position of the blades may be reversed or their pitch altered at the will of the pilot for purposes of control while the propeller turns in one direction.

The pair of propellers on the upper right wing are not made reversible, for simplicity in the construction and the description. So in following this description it is necessary to bear in mind that the upper right hand propellers are not reversible. Also when I refer to reversing any of the propellers, I reverse only the pitch of the propeller blades and not the revolution of the propeller shafts. In reversing the pitch of the propeller blades, the airstream of the propeller is reversed in a more scientific and less violent manner, than as if the shaft alone were reversed.

L and L' are the lower right and left hand wings, having ailerons A and A', respectively. The doors and transparent windows of the pilot's and also the passenger's cabin are well pictured and need no further designation.

M and M' are upper wing struts, while N and N' are lower wing struts. D and D' represent similar parts of the landing carriage, containing the shock absorbers; while T and T' are front and rear wheels of the landing carriage. B and B' are more or less torpedo-like hollow floats or pontoons, made so as to move with the carriage parts, D and D'; and at the same time serve as a means for streamlining the landing wheels.

K in Figs. 1, 3, 4 and 5 represents certain tubular portions of the turret, which, as indicated in some of the views, are pivotally streamlined so as to swing gently with the wind in any direction, as does a weather vane.

Figure 3:
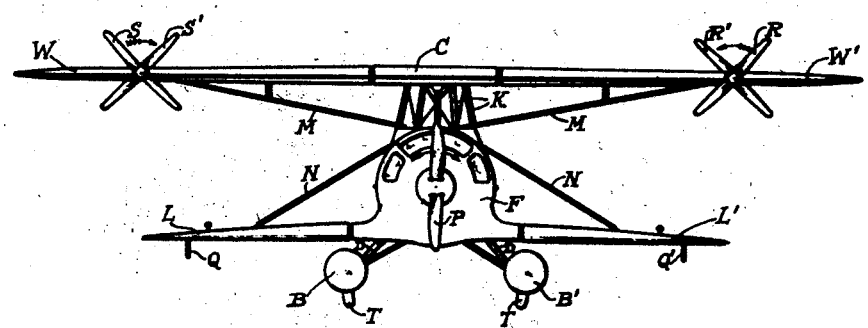
Fig. 3 is the corresponding front elevation of the airplane shown in Fig. 2.

Q and Q', in Fig. 3 only, are skids for wing protection.

V and V' are upper and lower fins to rudder post.

O and O' are upper and lower rudders. The fins and rudders are shown in Figs. 1, 2, 4 and 5; but are better shown in Fig. 6.

G and G' are gasoline tanks, preferably located outside of the fuselage frame on either side thereof. These tanks are shown in position on Figs. 4, 5 and 6, and are outside of the machinery space enclosing the engine.

E, in Fig. 6, is an airplane engine shown in full view in the lower central part of the fuselage. It represents an aircooled engine adapted to the location, and of some standard manufacture. Its vertical shaft, designated 1, receives power directly from the engine. Keyed on this shaft is a bevel gear 4, in gear box 7, meshing with gears 5 and 6, for transmitting some of the engine power in about equal amounts to the nose and tail propellers through the hollow shafts numbered 8 and 9. The preferred directions for turning these shafts are indicated by arrows around the shafts. Inside these hollow shafts 8 and 9, are the rods 10 and 11, for shifting the blades of the nose and tail propellers from full pitch ahead to full pitch astern. These propeller shafts are mounted in a series of ball bearings, 12, and they are guarded and stiffened by light tubular casings marked #13 and #14. In Fig. 6 15 is a fan, or blower, preferably of a strong centrifugal type, keyed to the vertical shaft, for taking outside fresh air through the top of the fuselage. The outside air first passes through certain adjustable shutters marked 16, follows the course shown by long arrows to the fan inlet 17, and discharges the air outwardly at the periphery 15a, being guided downwardly by the fan casing 18 and the guide members 19, so that the direction of the cooling air toward the engine cylinders is about as indicated by the small arrows. A heavy rim, 15b, is added to the fan to add to the flywheel effect.

We will now, for a moment, continue to follow this cooling air by referring to Fig. 7 on the same sheet. In Fig. 7 the casing, 18, is shown with the necessary extensions, 20, for guiding the air closely around the finned cylinders of the engine. The difficulty, however, of such a cooling arrangement occurs at the lower part of the cylinders in the wake of the air current, where the cooling might not be as effective as on the upper part and sides. So in Fig. 7, I show a special construction partitioning the air casing, 20, into a double series of channels, 21 and 22, formed by means of internal fins, 20a, in the air casing, as detailed in the adjoining Fig. 7a.

After the air has been used to cool the engine, it is released into the engine compartment, or machinery space, where it gives a general effect. The midship compartment of the fuselage, between the transverse partitions, 23 and 24, and between longitudinal partitions at the side, serves as a machinery space or engine compartment.

The transverse partitions, 23 and 24, are carried all the way up to the top of the fuselage, and serve as fire retarding walls. These transverse partitions may be provided with windows of "wire-glass" or other material that meets fire-proofing conditions. The gasoline tanks, G and G', are also protected by the longitudinal side partitions (not shown) at the sides of the engine compartment. These partitions have horizontal transverse portions (not shown) under the gasoline tanks, G and G'. Any holes necessary in the fire retarding partitions, for the passage of control rods, wire rope, etc., going to the engine or elsewhere, must be reduced to the minimum.

Referring to Fig. 6, the engine cooling air cools the engine and reaches the machinery space through channels 21 and 22, Fig. 7. Said air will gradually be forced by the incoming supply to leave the machinery space through side openings, 25, in the fuselage, or through the annular opening, 26, between the engine exhaust pipe, 27, and its outside protective tube, 28, thus serving to cool the outside of the exhaust pipe. Co-ordinately, the cylinder cooling air may be partly recirculated by the fan through openings, 29a, near the fresh air inlet shutters, 16. In fact, two dotted arrows show part of the cooling air being recirculated in this manner through the openings, 29a. Such recirculation would be excellent practice when the outside air is very cold. Openings, 29a, are provided with adjustable slide or lattice dampers, not shown. It is evident that by controlling the fresh air inlet lattice, 16, and the recirculating openings, 29a, the fresh outdoor air may be tempered so as to attain a proper temperature for cooling the engine cylinders in all seasons or climates. This can be done in a simple way to avoid excessive temperature strains in the engine cylinders, and perhaps avoid corresponding wear by the pistons. Increased economy in fuel is also possible, due to not cooling the engine cylinders excessively in very cold weather. This description is meant to cover only such fixed and hand adjustments of the lattice or slide dampers as can be conveniently made to suit weather conditions, without adjustment being made in flight.

If further adjustments should prove desirable, it would be well to have these controlled automatically by thermostat controlling the temperature of the air warmed by the engine cylinders. Such automatic control would not require any attention in flight on the part of the pilot. There are a number of such thermostatic temperature control devices used for controlling lattice dampers in heating and ventilating practice. Therefore such automatic temperature control apparatus need not be described here. At first, in a new design, such air adjustments in dampers should be made by hand as the simplest and safest way. Later, automatic temperature control may be added, if desired, as a refinement in the method outlined.

Fig. 6 also plainly shows various members of the tubular fuselage frame, 29, with its diagonal struts and tie tubes, which are usually welded into one piece, and therefore is marked with a single number. The four longitudinal members in the frame are called longérons. The engine is bolted to a tubular frame, 30, which is welded to the fuselage frame, or else fastened by bolts. What appears to be a small projection marked 31, on the underside of the engine at the lower end of the vertical engine shaft is preferably a small air compressor and automatic engine starter. This need not be described in detail as it is one of the compressed air engine starters that have come into use, and no claims are made for my use of it.

In general such device consists of an air compressor, and small compressed air storage tank (not shown). By means of the storage capacity alone, as many as seventeen engine starts may be made. The air compressor automatically keeps its storage tank supplied with high pressure air, storing it when the airplane engine is running. The air compressor of the automatic engine starter is built capable of supplying a surplus of compressed air. This surplus may be used as an auxiliary supply for the compressed air tank, 32, having a lower pressure, which I use as my storage reservoir for actuating various compressed air diaphragms etc., in my compressed air controls. Some form of compressed air starter is therefore preferable to the more familiar inertia electric starter, on account of its relation to other pneumatic controls described herein.

Fig. 6 shows a small separate air compressor, 32a, gear connected to power shaft 8, for supplying compressed air of a lower pressure (preferably 25 to 90 lbs. per square inch) to a compressed air tank, 32. Such compressed air is connected from tank 32 to various foot-controls for the pilot's use.

The round tank, 33, back of the pilot, merely represents a reservoir of engine lubricating oil. The floors of the pilot's cabin and of the passengers cabin have been marked 34 and 35 respectively.

Taking up the matter of power transmission to the propellers in the upper wing shown in my enlarged view in Figs. 8, 10, 11 and 15, it is very important to note that the vertical shaft 1 is not rigidly attached either to turret K or to the upper wing. Said upper wing and turret K, however, are rigidly attached to each other and turn together. The engine and vertical shaft may turn 1200 revolutions per minute, while the turret and upper wing, when driven as a helicopter by propellers, may turn the turret only 100 revolutions per minute. This not a matter of gear ratio in the main gears of the differential at the top of the vertical shaft, 1a, because that gear ratio actually causes the differential shafts, 36 and 37, in the upper wing to turn at an average speed faster than the vertical shaft 1a. These differential shafts, 36 and 37, primarily drive the upper wing propellers. Then these propellers, shown elsewhere in pairs (S, S', and R, R', in Figs. 1, 2, 3, 4, 5 and 6), become the means of giving the upper wing either a forward motion in straight gliding flight, or a rotary motion when the propellers, R, R', are reversed (when using the helicopter method of flight).

In Fig. 8, the vertical shaft 1a, has fastened to its upper end, by means of a tapered fit, key and nut, a bevel gear, 38, which meshes with gear 39. This pair of gears form the main gears for driving the differential mechanism shown on a larger scale in a later drawing, Fig. 15.

In Fig. 8, the large gear box, 40, forms a means of housing and stiffening the gear mechanism at this place. It provides support for all its main bearings, which are ball bearings. The only exceptions to this are, 41 and 42, where the bearings have felt rings and serve primarily as grease retainers. They have a secondary function as bearings. The upper half, or cap, of the gear box, 40, is marked 43. The lower half of the gear box, 40, must be properly and rigidly fastened to the wing spars in the central upper wing section, C, making the lower half of the gear box virtually a part of the central section of the upper wing. It is not deemed necessary to show such fastenings, ribs, or flanges on the gear box, 40, which are used for making these connections to the wing spars.

Fig. 8 is a cross sectional view of the turret when looking forward. It must be assumed that the upper wing, to which the large gear box 40 is rigidly attached, is in its normal mid-position with the upper wing at right angles to the fuselage. One of the principal functions of this turret is to communicate the lift of the upper wing to the fuselage, especially when the upper wing is revolving after the manner of a helicopter. This revolving must be done with the minimum of friction. The turret must have a broad base so that the upper wing may be steady. The turret must also take the thrust of a head wind, cross wind, or any other wind resistance. The broad base permits such clearance as is necessary to secure freedom of motion with great strength and rigidity.

A rail, 44, serves as means for the lower part of the turret to revolve. I fasten this firmly to the fuselage frame, 29 (see Figs. 8, 9 and 12), by means of a series of adjustable bolts, 45. This rail may be built of a high-grade, heat-treated metal, such as duralumin or steel. It should preferably be ground true at all surfaces coming in contact with the series of roller bearing wheels with which the turret is provided. One series of wheels I will call "lifting wheels", 46, and the other series of wheels I will call "guiding wheels", marked 46a. These wheels are plainly shown in both Figures 8 and 9. All these ball bearing wheels should be ground true all over; in fact, I form these wheels with the outer race of the ball bearings. These ball bearing wheels are securely fastened to the spiderlike frame at the base of the turret. The spiderlike frame has a hub, 47, and six radial arms, 48 (see Figs. 8 and 9). At the periphery of these six arms, there is a junction piece, 49 (see Figs. 8, 9 and 12), which with its fastenings serves to unite the series of tubular members of the turret, marked K, 48 and 50, the latter two numbers being shown on both Figures 8 and 12.

There are twelve lifting rollers in all, 46, and eighteen guide rollers, 46a, the latter in groups of three, clearly shown in Fig. 12. Altogether they serve to take the load wherever it may occur, and distribute strain and wear, when the load happens to be fairly uniform.

In Figs. 8 and 12, the centerpiece, 47, of the spiderlike frame is made in two halves, an upper and a lower half. The hub holds a tube, 51, so as to surround the vertical shaft loosely, but permitting the insertion of a liner, 52. This liner is preferably made of what is known as a graphite bushing, requiring no oil for lubrication against the vertical shaft 1a. The top of the loose tube is closed around the shaft by means of a cover, 53, for covering the free space around the shaft. The graphite bushing, 52, or the tube, 51, are not intended to find a bearing against the fast running vertical shaft. The bushing should have preferably a very loose fit with clearance. It serves only as a steadying device for any unexpected strain on the turret spider. The spider is really adequately centered, being guided by the guide rollers following the rail, 44.

The lower flange part of the graphite bushing, 52, rests on the flexible ratchet coupling of which 54 is the upper ratchet wheel portion and 55 the lower flange portion, shown in detail in Figs. 10 and 11. Both upper and lower portions are properly splined to, or welded to, their respective shafts. Fig. 11 is a top view, partly broken and partly in section to more plainly show the construction. Fig. 11 shows the trigger-shaped ratchet pawls, 56, counter-balanced to neutralize the centrifugal force of the rotating shaft, so that the turning of these pawls about their pins is controlled only by the pressure of their springs, 57. The whole flexible ratchet coupling is closed in by a corrugated cover, 58, thus retaining any grease required for lubrication. The corrugated cover should preferably be a loose fit against the ratchet wheel hub. In the same Fig. 11, the pawl pins are shown with black rubber bushings, 59, around them. These bushings may be made of rubber tubing cased with brass tubes. The encased rubber bushings make the coupling still more flexible. When the engine turns the vertical shaft 1, Fig. 10, in the direction shown by the arrow, the pawls will drive the ratchet wheel and the upper vertical shaft in the same direction. Should the engine "miss firing" and stop suddenly, the upper vertical shaft and propellers would continue to revolve of their own momentum; the springs of the pawl being designed to easily release the upper vertical shaft and not retard it. Usually when an engine stops in flight, it brings the propellers very quickly to rest, due to the high compression ratio in the cylinders. When the ordinary airplane lands, the propeller stops almost immediately after the "gas" and "ignition" systems are shut off.

One function of the "flexible ratchet coupling" is to enable the propellers in the upper wing to continue to revolve by their own momentum in the case of engine failure. When the upper wing is being revolved as a helicopter, an engine might fail when "taking off" after rising only fifty feet above the ground. With my "flexible ratchet coupling" the propellers and the upper wing would continue to revolve and thus insure a safe, easy landing, which might not be feasible with a coupling not provided with the ratchet device. At a height of fifty feet, it is thought unlikely that the pilot would have time to "center the upper wing" and glide to a comfortable landing. In case the engine failure fifty feet above the ground while using a "helicopter take off", it would be proper for the pilot to continue to hold the propellers in reverse position in the upper left wing when hearing that the engine was not functioning properly. Of course, other things might be done in addition, like starting the engine again, which is possible when a compressed air starter is used.

The flexible ratchet coupling is simply a flexible one-way coupling. Since its torque action is one way, it helps to check torsional vibration in the transmission shafting.

Another function of the "flexible ratchet coupling" is more difficult to explain. I hope to make it clear. Assume that the airplane is high in the air and is speeding along in straight flight as an ordinary airplane (without the upper wing being in revolution as a helicopter). Then assume that for some unknown reason the engine misses explosions and stops abruptly. The fuselage propellers would "go dead" with the engine in such an emergency, but all the upper wing propellers would continue to revolve ahead by their momentum and by the momentum of the shafting above the flexible ratchet coupling. Assuming that the pilot sees a good landing field ahead, he may choose to make an ordinary glide to this field, where he may land at the ordinary landing speed of about forty to sixty miles an hour. That would simply be an ordinary choice.

Now assume that the pilot sees no such opportunity as a good landing field, in which he may land at forty to sixty miles an hour. Assume that it is foggy and the ground uncertain, or assume that the airplane happens to be over a large body of water. In either case, landing, or alighting on the water, at forty to sixty miles an hour is extremely hazardous. While I have provided the landing carriage with floats or pontoons, they would need to be of the hydroplane type to land at forty to sixty miles an hour safely. In a fog, when one can't see the water, it would be hazardous anyway. Hydroplane pontoons are bulky and heavy in comparison with mine, which simply need to be large enough to act as floats and need very little reserve buoyancy. Mine are herefore lighter and offer less resistance to the air and also serve as streamlining for the landing carriage.

Under the above conditions, should my motor stop suddenly, it would be possible for the pilot to start his glide with the upper wing propellers revolving at the given momentum. The ratchet wheel would prevent the engine from slowing down the upper wing propellers. It is true they would begin to lose momentum, whereupon the upper left wing pair could be reversed while the upper right wing propellers would continue to go ahead. The action of these upper left wing propellers in going into the "reverse" with the upper right wing propellers in the "ahead" position, will be to start the large upper wing revolving. It is explained later that the turret is automatically released by the compressed air line which goes to the reversing cylinder from a "foot-button" valve at the pilot's feet. Such quick action would enable the pilot to make a gradual spiral glide to the ground or water with comparative safety. The glide would be slight at first and would become steeper as the upper wing gathered momentum in its spiral descent, assisted by the action of gravity as in the case in a straight glide of an ordinary airplane. It would be foolish to try to predict such a spiral glide with much accuracy. It will undoubtedly require some practice and experience to do it smoothly; and is, of course, an emergency maneuver only, which illustrates its utility.

I must not fail to make my point that the "flexible ratchet coupling" makes it possible to start the big upper wing spinning without having to drag the engine with it. With a given start, the upper wing will continue to spin just as the airplane continues to glide when acted upon by the force of gravity. The ratchet coupling co-operates in this purpose to secure a safe landing at low speed. It is therefore a safety device.

The point of safety desired is to reduce to a minimum the horizontal component in landing (mentioned as forty to sixty miles per hour in present-day airplanes). This horizontal component is expected to be largely absorbed in the helicopter type of landing by the spiral motion of the upper wing, making it possible in an emergency to alight safely upon the water, or upon ground not considered practicable for the ordinary long glide. This reference to safe alighting is made to airplanes making what is termed a "forced landing" with a "dead engine"; but the comparison is equally favorable for the helicopter type of landing when the engine is running, since any considerable ground speed is always disadvantageous for safety in landing upon unfavorable ground, or upon any surface obscured by mist or fog.

Before leaving Figs. 8 and 9, attention is called to the purpose of bringing the upper and lower vertical shafts together at the "flexible ratchet coupling" and level with the center line of the turret track 44. This was done to enable tilting the turret track by means of a series of adjusting bolts, 45, which are capable of giving the track and turret a tilt of three degrees backward or three degrees forward, thus making possible a corresponding incidence in the upper wing. Each adjusting bolt is threaded through a long reinforcing "I shaped" fitting, 60, welded in the fuselage frame, 29. A short "stirrup like" piece, 61, bolted to the circular turret track completes the means necessary for setting and securing the track in any desired position within the limits mentioned. The fuselage frame, 29, not only forms a hollow square around the turret track, as shown in Figs. 6, 8 and 9, but the plan view, Fig. 12, shows curved tubular portions stiffening the circular track all the way around. Such curved portions are trussed and welded to the fuselage frames. Fig. 12 also shows the relative positions in the plan view of the short "stirrup like" pieces, 61, and the adjusting bolts, 45.

In Figs. 8 and 12, the tubular pieces, 62, form another hexagonal frame for stiffening the turret and balancing the strain coming from the long wing struts, M and M', so as not to injure the turret or twist it out of form. In Fig. 8 certain stiffening tie rods, 63, are shown. It should be observed that the complicated lower part of the turret structure has all been housed below the stream line of the fuselage shown in Fig. 6.

In Fig. 6 and in the lowest part of turret detail, Fig. 8, there is shown a nest of six rotary air valves of which U1, U2, U3, U4, U5 and U6 are the outer stationary portions to which the airlines are attached. They represent the means I employ for connecting compressed air lines of my controls from the pilot's foot-button valves up through the spiderlike revolving turret and back to the pilot's foot valve, when for example the vertical shaft is traveling 1200 revolutions per minute and the turret turning possibly 100 revolutions per minute. Practical compressed air controls are no simple matter to design for a vibrating structure like an airplane. Added to this is the requirement of making all those air lines revolve within the turret structure, and keeping the joints air tight. These rotary valves are detailed in Figs. 18 to 24. After the compressed air enters the outer stationary portion of each valve, there are certain air lines, as 64 in Figs. 8 and 9, which must be connected to the inside rotary portion of these air valves and go up through the hollow tubes, K, of the turret. The way I do this is by fastening the inside rotary portion of the valves to six tubular struts, 65, and by attaching each of these to a "lug-sleeve", 66, (only one is shown) welded to the six tubular arms, 48, of the spiderlike portion of the turret. By this device, the turret, certain air pipes, the inside portions of the rotary valve, and the upper wing, all revolve together. It is possible to perform all the mechanical functions that I do in the revolving wing with electric controls, which would have the advantage of slightly quicker operation. But I prefer compressed air for this work as being simpler, less liable to get out of order, and a more reliable installation to operate and maintain.

Figs. 12, 13, 13a and 14 show particularly the manner in which the turret is held to the track, and how it may be released so as to revolve freely upon its wheels 46. Fig. 13 is a vertical cross-section of a diaphragm motor, 67, taken near its center line, and gripping the upper part of a fragment of the circular track 44. A piston rod bolt, 68, holds a spiral spring, 69. This spiral spring is always in compression so that the spring serves to cause the metal brake shoes, 70 and 71 (shown also in top sectional view Fig. 14), to grip the track, 44, through certain asbestos brake linings marked 72. The metal brake shoes, 70, must be welded to the diaphragm motor frames, 67. 70a is a lock nut fastened to 70 for moving 70 away from the track, when the spring-like property given to the arms of junction piece, 49, spring away inwardly from the track.

Six of the twelve diaphragm motors are shown in position in Fig. 12. They are supported in place by short springy arms of junction piece 49. The piston of this diaphragm motor consists of a circular disc, 73, and a round diaphragm, 74, made of heavy rubber with fabric reinforcement. A round cover, 75, bolted as shown, forms an airtight space 76 except that an air pipe, 77, for compressed air, is threaded into the round cover.

When no compressed air is used, the springs, 69, will hold all the brake shoes tight against the track, for holding the turret and upper wing in its normal mid-position. When the pilot presses his foot on a certain foot-button in his cabin, compressed air flows to all these twelve diaphragms 67, thus instantly releasing the large upper wing when reversing the upper left wing propellers. Such action results in rotating the upper wing in the helicopter manner.

In Fig. 12, a number of smaller tubular members (not given any separate number), are welded to the tubular fuselage frame, 29, for the purpose of bracing the tubular ring and fuselage frame to which the turret track is bolted.

Fig. 15 is an enlarged sectional view of the large gear box, 40, with its main and differential gears, shown also in Figs. 6 and 8. The fastening of this gear box to the central section of the upper wing would be made in some simple manner not shown. The section of the gear box and its upper half, 43, is taken at the center line of the upper wing shafts 36 and 37. The upper vertical shaft, 1a, with its ball bearings is clearly shown. Arrows around the three shafts mentioned indicate how these shafts turn. In addition to the main gears, 38 and 39, previously mentioned, there are the important differential gears, 78 and 78a, which are keyed to the short shafts, 80 and 80a, which revolve with the small differential gear box, half of which has been marked 81. The other half of the differential gear box is made in one piece with gear 39. The circumferential seam and bolts are not shown. The screw caps, 79 and 79a, serve as covers over the ends of the small shafts, 80 and 80a, to retain grease, since the differential gear box revolves with gear 39. Differential gears, 82 and 83, keyed to shafts 36 and 37 respectively, are arranged to mesh with the differential gears, 78 and 78a. Attention is called to the fact that 36 and 37 are separate shafts, with a space between their ends, marked 84. Shaft 36 serves to transmit power to the upper left wing propellers, and shaft 37 to the upper right wing propellers. When my airplane is being driven after the manner of present-day airplanes in straight flight in still air (no wind blowing), the differential gears 78, 78a, 82 and 83 will all revolve together at the same speed. Under these conditions and with the upper wing held firmly by the turret brakes to the fuselage, the differential gears serve to nicely balance the turning moments of the upper left wing and upper right wing propellers. In such a simple case, both the turning moments, the speed, and the power would be balanced. The differential gears will tend to balance wind gusts not hitting left and right propellers with the same force. In case of a turn, which always requires banking of the air plane, a slightly different handling of the ailerons and rudder might be necessasry, when compared with the handling of present-day airplane. I will not attempt to make this comparison clear; but I will note one point of difference. With my airplane, when the rudder is turned to the left, it puts a slight increase in drag on the left wing propellers; which causes the right wing propellers to speed up slightly, a desirable condition for helping the turn and assisting to raise up the right wing, in banking for a left turn. I do not infer that in banking the use of the ailerons can be dispensed with; I only say that the differential gears automatically tend to assist the rudder in making a left or right turn,—thereby helping the airplane to bank, a feature which should contribute to better balance on turns and simpler control.

I will now point out how it is possible for the differential gear to assist the rudder much more substantially when making a turn. At the extreme left and at the extreme right of Fig. 15, are shown two drum-like brake sheaves, 85 and 86, which are keyed to shafts, 36a and 37a. The brake sheaves are made so as to serve also as shaft couplings with corresponding halves on the outer ends of shafts 36 and 37. The half-couplings are suitably keyed, bolted, and welded to the shafts, and an internal split ring, 87, is provided to prevent these shafts from being pulled apart. Each of these brake sheaves has a diaphragm compressed air motor, 88, suitably fastened (but not shown) to strong wing ribs and spars. It is arranged so that when compressed air is delivered to the air motor, 88, by the pilot's pressing one of the left foot-buttons, the air motor gently but firmly causes the brake band to tighten on the left brake sheave, slowing down the upper left wing propellers, while at the same instant the right hand wing propellers speed up, entirely due to the automatic action of the differential gears, without requiring any adjustment of the engine speed. This action by the left brake sheave air motor would very much assist a left turn. It is also provided to likewise assist a right turn by means of an air motor with brake band on the right brake sheave 86, when actuated by compressed air from a foot-button placed near the pilot's right foot. As soon as the foot is taken away from the button the brake band is again released. This will be explained in further detail later.

Figs. 16, 17 and 17a show larger detail views of these upper wing brake sheaves, brake bands and diaphragm air motors. The upper half of Fig. 16 is an outside view, whereas the lower half is a sectional view. Fig. 17 is an end view from the right of Fig. 16, with the upper parts broken away so as to show their construction, including the diaphragm air motor. These motors are slightly tilted in installing them in the wing (see view at the left of Fig. 15). As already mentioned, 88 is the frame of the diaphragm air motor having a circular flange mounting a heavy rubber diaphragm, 89, reinforced with fabric and secured in place with a cover, 90, and flange bolts. They thus enclose an airtight space, 91, except where the compressed air pipe, 92, enters. Fig. 17a shows a fragmentary top view of Fig. 17, partly in broken section on the line, c—c. This top view shows the construction and operation. The spring, 94, around the air motor piston bolt, 93, is always in compression; tending to keep the brake band, 95, open, so as not to touch the brake sheave, 85, except when compressed air is admitted by the pilot to the space, 91, back of the diaphragm through pipe 92. When this occurs, the spring, 94, is compressed and the brake band, 95, with lining, 96, take hold of the brake drum smoothly and firmly. At 97 are shown holes in the frame of the diaphragm air motor to assist in holding it in position and fastening it inside the wing structure. It is not necessary to show such fastenings. Other details not specifically mentioned and numbered, such as fastening of linings in brake bands etc., are familiar to mechanics engaged in the art.

Before leaving the subject of these control brakes, I wish to emphasize the fact that in straight flight with fixed upper wing, when the brake is applied in either the left or right wing, the propellers on the opposite wing speed up. This speeding up results in more power going into the propellers of the opposite wing, tending to turn the ship. The action may therefore be likened to that of a sea-gull who, flapping both wings in flight, sometimes wheels around by giving less stroke to one wing and putting more power into the other. I get a similar effect by slowing down the power given to the propellers of one wing, and thereby automatically increasing the power given to the propellers of the other wing. This method of steering is not only more effective, but it automatically banks the airplane to suit the turn. During this maneuver, the average power required by the engine would essentially be unchanged.

Take another familiar illustration of a boy coasting down hill lying flat on his sled. To make a sharp left turn, he touches the snow with his left toe far out on the left side of the sled,—putting on the left brake as it were. To make a sharp right turn he does the same with his right toe.

To carry the analogy still farther, the sharpness of the turn is proportional to the braking effect, or braking moment produced by either right or left toe. The pilot can produce corresponding effects in steering my airplane with his right or left foot, while sitting upright in his cabin, bearing in mind the proper use of other controls that are necessarily incidental for maintaining the usual stability in flight Figs. 18 and 19 show a larger view of the six rotary compressed air valves, of which U1, U2, U3, U4, U5 and U6 are the outside stationary parts bolted to two angle pieces, 98, which in turn are firmly anchored to the fuselage frame by means of two tubular members, 99 (not completely shown). Fig. 18 is a sectional elevation of the rotary valves and their stationary positions. The section is taken on the line $w'—w$ of Fig. 19, the latter figure being an outside view from above. It is important to notice that the line $w'—w$, corresponds to the position of the upper wings, $W'—W$, (left and right upper wings) when the upper wing and turret are held in their normal position for straight flight. The nose of the plane in Fig. 19 would be toward the top of the sheet.

The inner rotary parts of these valves are in two halves, upper and lower. The lower halves have all been marked m1, m2, m3, etc. On their inner diameter they are forced onto tube 100, so as to make a tight joint. The tube 100 is just a short tube shown broken at its ends and serving a second purpose of enclosing the fast revolving shaft 1, shown in section in Fig. 19.

The stationary portions of the valves U1, U2, etc., are sandwiched in between two halves of their respective rotary valves having accurate ground joints 101, forming a labyrinth packing to avoid leakage of any compressed air. A series of six bolts, 102, drilled through solid lugs, 102a, on the valve hub, serve to clamp all the valves tightly together. They will revolve as a unit with tube 100, on account of their connections, 65, with the turret as shown also in Fig. 8. For simplicity only two of the six connections, 65, are illustrated. When the rotary portions of the valves are tightly bolted together, there should be left a small clearance space between the stationary portions U1 and U2, likewise between U2 and U3, etc., so as to permit proper fit, etc., when "grinding in" the valves, where the parts rub together. These labyrinth packings would be a failure in practice if connected with a fast running shaft like the vertical shaft 1. As arranged herein, they revolve at perhaps one-tenth of the speed of the vertical shaft 1. This assures practical commercial success. Fig. 19 clearly shows the hollow vertical shaft, 1, in cross section and the large open space all around it, so that it cannot touch the tube, 100, upon which the rotary valves are mounted.

In the plan view, Fig. 19, there are shown the ends of six compressed air pipes (shaded black) coming out of the top of the nest of valves. These pipes take various routes in going from the rotary valves up into the turret; and three of their continuations pass through the turret tubes K to their respective destinations in the upper wing. I will explain, for example, two of the six pipes. In Figs. 18 and 19, the pipe 64 is screwed into the lowermost rotary valve in the nest and passes up through these without interfering in the least with the airtightness of the valves above it. The metal lugs, 104, near the valve hub, completely surround the pipe in all the five upper valves, thus preventing the escape of any air. At the same time the pipe 64 passes up through these metal lugs with with proper clearance all around the pipe.

Another pipe 109a, shown in Figs. 18 and 19, is screwed into the next lowest rotary valve and passes up through the rest of the nest, and then through the turret etc., to find its destination in one of the brake diaphragms in the upper wing.

In Figs. 18 to 24, the screw connections 105, 106, 107, 108, 109 and 110 are the compressed air connections for compressed air pipes coming from various foot-button controls at the pilot's feet. In Figs. 20 to 24 are the detail cross sections of the lower five of these rotary valves including provision for connections. They are sectioned as needed for illustrative purposes.

The five valves illustrated in Figs. 20 to 24 are the five valves lowest in the nest of six. Fig. 20 is the valve next to the top of the pile, and Fig. 24 the one at the bottom. An arrow through the center of each valve, pointing towards the top of the sheet, indicates the normal center line position of each valve, when the upper wing is athwartship. Hence the point and tail of the arrow correspond to the nose and stern of the fuselage. In Fig. 20, the compressed air enters the valve chamber, 106c, at 106 and leaves it at 106a. See also Fig. 18 to make this clear. The function of pipe 106a is to connect with compressed air devices in the upper left wing. Screw plugs closing certain tapped holes are marked 111. Figs. 21 and 22 resemble the valve in Fig. 20, in that they both serve to make a connection between compressed air entering a stationary pipe as at 107 or 108, and leaving a rotary part through 107a or 108a respectively (see also Figs. 18 and 19).

The two lower valves in the nest are different in their action from the upper four. The two lower valves have timing actions and function more like engine slide valves in their cycle of events. In order to avoid the necessity of using a model, I have taken the liberty of lettering the periphery of Figs. 23 and 24 so as to indicate the timing effect of the rotary valves in their turning. I have also shown thereon an index, which looks like a sharp inverted V, which has nothing to do with the construction; but which shows the turret (and its valves) in its normal mid-position and turns with the inside rotary part of the valve. The position of the right wing is marked with a black section R. W. on the tube 100, and the position of the left wing is likewise marked L. W. In these two valves, Figs. 23 and 24, the compressed air chambers are in the stationary part of the valve. Each valve has a stationary chamber marked "Pressure" for receiving the compressed air; and each has a stationary chamber marked "Exhaust" through which air is exhausted to the atmosphere through threaded openings marked 112 and 113 respectively. These threaded openings may remain open, as shown; or they may be bushed down to receive screw plugs with suitable reducing holes to serve, if necessary, as a fixed adjustment for throttling the escaping air. These threaded openings may also serve a purpose like connecting with the pilot's cabin, where the escaping exhaust air might inform the pilot of what is going on in the two rotary turret valves. The three spaces in each of the valves, Figs. 23 and 24, marked D. S., are simply dead spaces or hollow spaces, that take no part in the operation of the valves. The small openings "Q" are relief holes at the dead center for the escape of compressed air from pipes 104 and 64, shown also in Fig. 18, whenever the upper wing has been properly centered and is steady or "at rest" in its normal mid-position. Such relief of compressed air insures strong gripping by springs of turret brakes by relieving all pressure from their diaphragms.

Now to explain the operation of centering the upper wing by means of the rotary valves in Figs. 23 and 24, it must be understood that a certain "centering" foot-button, actuated by the pilot, supplies compressed air to a pipe having branches, two of which enter the stationary portion of the valves U5 and U6 at 109 and 110 respectively. When the unit composed of upper wing, turret and valves happens to be in midposition, as indicated by Figs. 23 and 24, then the compressed air will enter both chambers marked "Pressure" and do nothing, because the wing is already centered. Now for further illustration, let us assume that the airplane has reached a considerable height, say 3000 feet, and is moving along at a moderate speed, about forty or fifty miles per hour, with the upper wing revolving; the pilot will therefore be pressing the reverse foot-button and the left wing propellers will be "in reverse". The pilot watches his chance. Taking his foot off the reverse, he quickly presses the "centering" foot-button when his upper wing is within say an eighth of a turn (45 degrees) of its final mid-position (called "centered" for straight flight). That means that the pilot presses the centering foot-button when both valve indices would be pointing about 45 degrees to the right of the position shown in Figs. 23 and 24. As the index swings from right to center the following events occur: The left wing propellers go into the "ahead" position, and the left wing propeller brake comes quickly into play by means of compressed air going from 109 through the "pressure" to 109a, thus slowing down the left wing propeller and speeding up the right. The diagram, Fig. 24, shows that compressed air has no action on the right wing propeller brake in this 45 degrees swing. Such action of the left wing brake tends to hasten the whole wing along to its "central" position and to overrun the central point. As it overruns the "center", the compressed air, through the valve in Fig. 24, quickly comes into play putting the brake on the right wing propeller, the pressure going from 110 through the "pressure" space to pipe 64, which leads to the air motor diaphragm of the right wing brake. This second action immediately tends to overcome the momentum of the wing, preventing the big wing from turning and compelling it to return to its "centered" position. If the wing again overruns a little, the left brake again comes into action etc., until any oscillation is completely damped, and the wing is "centered". Then the pilot may take his foot off the "centering" foot-button.

It might be mentioned that there should be a dial added to the pilot's instrument board, actuated by a pair of gears from the tube 100, by means of a flexible shaft similar to those used for automobile speedometers. It is not necessary to show this in my drawings. This dial would revolve with the upper wing and indicate the speed and exact position at all times,—day, night or fog. Of course the pilot must maintain the speed of the airplane and incidentally control its flight properly in "centering" the wing.

It need hardly be mentioned that should the upper wing at any time get a little off center, it could be "centered" whenever the engine is running by pressing the "centering" foot-button. A little more needs to be said later about the action of these valves in explaining a later diagram of the compressed air piping, Figs. 31 and 32. Before coming to this, an explanation must be made of the device for assisting in reversing the left wing propellers.

It has already been pointed out that the "flexible ratchet coupling" does not interfere with the free movement of the turret in centering the upper wing.

Figs. 25, 25a, 26 and 27 are all parts of the motor transmission shafting in the upper left wing. Figs. 25 and 25a are plan views from above (see also Fig. 2), showing the left wing shaft 36a, and the left wing propeller shaft 114, to which it is connected by means of bevel gears 115 and 116. These gears are contained in a grease-tight casing 116a, which is made in halves, the top half being removed showing a series of flange bolt holes marked 117, for bolting the halves together. The shafts shown are mounted in ball bearings, and they are strengthened by being surrounded by light tubular casings marked 118a, 118b and 118c, etc. A flange ring 119, shown in section, serves to hold one of the line shaft ball bearings in place; assisted by a pair of flanges 120, each being in halves, thus facilitating assembly. The four pieces marked 121 are the lower halves of clamps provided with bolts for clamping the tubular casing tight around the various flanges, so as to make a complete tight casing strengthening and protecting the shafts. The gear casing, 116a, is also firmly bolted to the wing structure, as for example the box wing rib 122; and also to the cylinder holder 123. The cylinder holder, which is shown in broken section, has a cylindrical form and serves as a recess for receiving the screw connection of the propeller reversing cylinder 124. The cylinder head 125 is shown in section, having a pipe connection 126 for compressed air, and a stuffing box portion provided with an adjusting nut, 127, and packing, 128.

Within the cylinder 124 is a piston, 128, having proper piston packing etc. Into each end of this piston are screwed tubes 129 and 130 respectively. These tubes serve to form a hollow piston rod sufficiently large to allow the propeller shaft, 114, to pass through and allow plenty of clearance. So the revolving propeller shaft in the upper left wing never touches the tubular piston rod. The shafts, 114 and 36a, have arrows wrapped around them indicating their direction of turning.

One portion of the hollow piston rod 130 is screwed into the piston 128, while its other end is screwed into crosshead 131, which is made in halves, being bolted together by six bolts. Two of these are detailed in Figs. 26 and 27. The bolt flanges of this crosshead are used as slides moving along the guide surfaces 132, that are present in the upper and lower halves of the gear box 116. The piston 128 is shown in its mid-position; but doesn't remain there, as the cylinder spring, 133, is in compression. The normal "ahead" position of the piston is tight up against the cylinder head 125. The piston moves away from the head 125, only when a considerable pressure of compressed air is admitted at pipe 126. The piston 128, cylinder spring 133, etc. are shown in diagrammatic form in the upper left hand corner of Fig. 31.

The crosshead, 131, is shown more clearly in larger detail in Figs. 26 and 27. Fig. 26 is a side view of the crosshead and shaft 114 viewed from the right. Fig. 27 is a cross section on the line, $f$—$f$, of the crosshead shown in Fig. 26. It is also the same cross section at, $k$—$k$, Fig. 25, but turned at right angles.

Figs. 26 and 27 show a rod, 134, inside the hollow shaft 114. This rod (shown solid, but which may be hollow) is fitted so as to be capable of sliding back and forth inside the hollow shaft. This rod is reduced slightly in diameter in long portions (not shown) so as to give clearance and prevent any binding in the sliding friction.

Two (2) high-grade crosshead pins, 135a and 135b, are accurately screwed by right and left threads into the interior rod 134. An internal square pin 136 is fitted to lock the crosshead pins so that they cannot come out. The crosshead pins are provided with bearings, 135, working in elongated oval slots, 135s, on both sides of the hollow shaft, 114. The ends of the crosshead pins protrude in between a pair of thrust collars marked 137, which in turn are completely surrounded by the large crosshead 131, into which the two halves of the thrust collar fit rather loosely, so that there is the least possible friction between these collars and the crosshead, except when a change is made from reverse to "ahead" or vice versa in shifting the blades of the left wing propellers. It is not easy to show this on the drawings, but I prefer to make these thrust collars of what is known as "graphite and bronze oil-less bushing" material. The lubricating graphite is packed into grooves in the bronze with hydraulic pressure.

In connection with Figs. 25, 25a, 26 and 27, the principal point to remember is that the compressed spring 133 keeps the piston 128 up against the cylinder head 125, so that the left wing propellers are always in the "ahead" position, unless the action of the spring is overcome by putting compressed air into the cylinder by means of pipe 126, in which case the left wing propellers are reversed through the movement of shifting rod 134. It has been pointed out that for simplicity in the controls, no reversing cylinder or reversible propellers are used in the upper right wing, but the bevel gear case 116b, and shaft protecting tubes are installed there in the same way as in the upper left wing, but to the other hand. See also Fig. 2.

An alternate arrangement could be made of using a reversing cylinder only in the upper right wing, which may possess advantages; but the principle of such alternate arrangement would, in general, be the same as the arrangement shown.

Before explaining any more about the compressed air controls, I will explain certain hand controls shown in the large isometric diagram, Fig. 28, with details in Figs. 29 and 30. The diagram shows a dual control arrangement with two separate controls or joy sticks, 138 and 138a, either one of which will control the ailerons and rudders.

As already designated A and A' are the right and left ailerons; O and O' are the upper and lower parts of the rudder, which are secured to and turn with rudder post 139. The control surfaces are shaded for the purpose of making them stand out on the drawings. There are two sets of swinging pedals, each marked 140 and 140a, for the right and left foot of either pilot. 141 and 141a are pulleys properly fastened for wire rope connecting the pedals as shown. There is nothing new about the way this dual pedal control operates the rudders O and O', so there is no use in explaining it. When the pilot pushes the left foot forward, he turns his rudder to the left tending to make a left turn etc.

I will explain the operation of the control stick on the ailerons, because it is essentially different from any standard control that I know of. The controls sticks, 138 and 138a, are pivoted and made to swing from right to left as well as forward and backward, at the ends of the tubular shaft 142. Such shaft is held in place by two bearings, 143, the latter being fastened to the floor of the pilot's cabin.

At each end of these bearings there is a collar, 144 (see Fig. 29), welded upon the tubular shaft preventing any end play in the shaft. A lever, 145, with a boss in the top is welded to the tubular shaft, 142, in the position shown. In the center of the lever there is a small boss with a bolt, 146 (see Fig. 30), welded into it. Upon the projection of this bolt is pivoted a quadrant 147. This quadrant is pin-connected at the bottom with the tubular connecting rods, 148 and 148a, whose outer ends are pin-connected to the lower ends of the two control sticks by bolts, 149.

At the bottom of the lever 145, there is a pin connection to the forked tubular rod 150, which has a double triangular portion at its other end for housing three floating pulleys, 152, 152a and 153. These three floating pulleys move longitudinally with rod 150. At the apex in the group of three floating pulleys is pulley 153, whose wire rope 158, and guide pulleys lead to the upper horns of the aileron levers.

The quadrant 147 has a wire rope 154, fastened firmly at its middle in the center of the quadrant groove. The ends of this wire rope 154 are fastened to a fitting 151, anchored to the floor. This wire rope 154, is made to form an almost complete loop with turn buckles, 155 and 155a, for making it taut. Such loop is centered at the quadrant 147, and its ends carry master floating pulleys, 156 and 156a. The wire ropes, 157 and 157a, attached to these floating pulleys, lead respectively to the lower horn of each aileron lever. The floating pulleys, 152, 152a, 153, 156, and 156a, are the master pulleys in the rig. They not only turn, but they move longitudinally corresponding to certain movements of the joy stick.

Therefore when either control stick is moved by a pilot from left to right and vice versa, it will rotate quadrant 147, so that said quadrant turns about the bolt 146; thus shifting the floating pulleys 156 and 156a, moving the ailerons up or down as the case may be. When the right aileron moves up by such a motion of the control stick, the left aileron is turned down and vice versa. The wire rope 158, directed by guide pulleys etc., is always in tension and communicates the pull given from one aileron to the other so as to co-ordinate their actions. The guide pulleys are not numbered. They simply turn with the wire rope. Their housings are fastened.

My ailerons have an additional function, acting as elevators, equivalent to horizontal rudders for inclining the plane upwards or downwards when in horizontal flight.

If either control stick is pushed straight forward, toward the nose by the pilot, the tubular shaft 142 will turn so as to move the following parts: the attached arm 145, the tubular rod 150, with its three pulleys 152, 152a and 153, etc.: thus turning both ailerons down and depressing the course of the airplane. The ends of wire rope 154 are firmly anchored at fitting 151. The turnbuckles, 155 and 155a, take up slack. If the pilot pulls the control stick straight backward toward the rudder, it will cause a double pull on wire rope 158, going to the upper horn of both ailerons; thus relieving wire ropes 157 and 157a, so that the ailerons will turn up in unison, directing the course of the airplane, in proportion to the amount of pull given to the control stick. The duration of such movements of the control stick are of course very brief, and often require rectifying movements to prevent going too far in the directions indicated.

It becomes apparent that the pilot may move the end of the control stick in such a manner as to obtain combination effects, such as a combination of pushing the joy stick straight forward and a movement to the right. The combination effect obtainable corresponds with the resultant of the two component movements. In fact the joy stick is arranged to move around in a circle. It is feasible to obtain equivalent results to those obtained by such standard types of control, in which a combination movement of both ailerons and horizontal rudder (elevator) are employed. My object is to obtain results equivalent to present-day practice without the use of a "stabilizer" and horizontal rudder (called elevator). The elimination, or minimization, of these parts of the tail is a step toward greater safety under some conditions of emergency imposed by present airplanes getting out of the pilot's control.

In the upper right hand of Fig. 28, the two rudders, O and O', are regarded as fundamentally necessary, especially for steering when the flying machine glides to the ground with a dead engine. Nevertheless, the effect of such rudders depends upon the speed of the machine in flight. In an airplane or in a boat, the rudder effect becomes nil when there is no forward motion.

The above shortcoming must be supplied in an airplane that must operate as a helicopter. It is necessary to provide additional steering means to maintain minimum horizontal speed, or even hover in the air, and yet maintain control of its position and direction.

Among the influences tending to turn the fuselage about a vertical (normal) axis, may be mentioned any unbalanced moment or irregularity in friction due to revolving the upper wing. Irregular turbulent winds might have a similar tendency.

I therefore provide a pair of straight bladed variable pitch "propeller-like" members, called auxiliary rudders, J and J', to take hold of the relatively quiescent air and move the stern of the airplane either to the right or to the left at the will of the pilot.

The hubs of these revolving auxiliary rudders are made like miniature variable pitch propellers described later, but the blades are of a straight streamline character without twist. They are revolved by means of bevel gears meshing with bevel gear 158a, keyed to tail shaft 9.

The rudder post, 139, is provided with a pinion meshing with a rack in the lower part of frame 158b, said frame permitting the shaft 9 to pass through. The upper part of frame 158b also has a rack cut into it, which actuates a pinion on the lower end of rudder post 139a. For a larger detail see Fig. 30a.

The frame 158b and the rudder post gears are all enclosed in a grease tight case, including the necessary bearings and guide rails for the sliding movement of frame 158b. The grease tight case, guide rails, etc., are indicated at the rudder posts in Fig. 6. In Fig. 2, the short shafts to the auxiliary rudders are shown supported with the necessary outboard housings, and bearings, properly streamlined into the fuselage.

The auxiliary rudders, J and J', revolve in opposite directions relative to each other as indicated by arrows in Fig. 28. However, their blades turn in the same direction as adjacent blades of the stern propeller. This tends to prevent loss of efficiency in the larger propeller.

The whole arrangement is so designed that when a pilot moves the steering pedals, 140 and 140a, he causes the turning of rudder post 139, such turning being communicated to the other rudder post, 139a, through the pinions and racks already described.

The rack frame, 158b (see Fig. 30a), has two forked ends, which take hold of a groove in the end of internal shifting rods within the hollow shafts of the revolving auxiliary rudders. The blades of the auxiliary rudders are shifted in a similar manner to shifting the pitch of the blades of propellers, which will be described more in detail in connection with a subsequent Fig. 36. However, in the case of the auxiliary rudders, the shifting of the blades is not self-locking, but responds to the pedal movements of the pilot's foot. Such movements cause both revolving auxiliary rudders to act in unison so as to pull the stern to the right or to the left as the pilot directs. He may also cause them to remain neutral in their central position. The auxiliary rudders are equally effective whether the airplane is hovering or is in medium speed flight. They gain somewhat in effectiveness with any considerable increase in speed.

Fig. 31 is essentially a picture diagram of the compressed air controls. It is not intended to be an accurate scale drawing of the various parts already described and illustrated. The various parts, however, have been numbered for identification so that they can be understood by referring to details already given.

Fig. 32 is a full size detail cross-section of one of the foot valves used by the pilot. The valve body, 159, is of metal in a cylindrical form and is provided with a liner, 160, having three sets of port openings for the passage of compressed air, the middle set of openings being numbered 164. A cap, 161, holds the valve liner in place, making a screw joint. The valve spindle, 162, has cylindrical, and square guiding surfaces, top and bottom respectively; and particularly includes the important cylindrical valve portion marked 163. This valve portion is slightly notched so as to permit a finer adjustment of the air flow at the points of just opening, and just closing, the valve ports, 164. Of course the valve must fit the liner accurately. The compressed air enters the valve liner from the air tank through pipe, 165, as indicated by an arrow in Fig. 32, and is stopped by the valve portion 163. At the same time this notched valve, 163, is normally just a shade above the port, 164, permitting any compressed air that may remain in pipe 166 to flow back past the notched valve 163, out to the atmosphere through the small hole in the screw plug 167, as indicated by the arrow. Such is the normal position of the foot valve.

The valve is actuated by the pressure of the pilot's foot, or toe, upon the foot-button, 168, compressing springs 169 and 170. Double springs are used as a matter of safety, so as to be sure of at least one being operative in case the other is broken. The construction is such that the foot-button can only be pushed sufficiently far to fully open the notched compressed air valve, 163; and when the foot pressure is removed the springs return the valve to its normal position, allowing the compressed air previously used to escape to the atmosphere through the hole in the screw plug 167. Said hole is a fixed leak, and is made sufficiently small so as not to obtain too rapid an escape of air. Its size is determined by practice, using different size plugs with different size holes and testing out on the ground their effects in timing the compressed air release. The valve is set into the floor, 34, of the pilot's cabin, and fastened by bolts not shown.

The diagram, Fig. 31, of the compressed air controls, shows at the bottom a compressed air tank, 32, supplied, as shown by dotted arrow, from a pipe at the left coming, supposedly, from a small air compressor, 31a (in Fig. 6), driven off shaft 8, connected with the airplane engine. The air tank is provided with a main air valve, 171, safety valve, pressure gauge, drain cock, etc., and has an air filter, 172, in the main tank discharge line, 173. This air line, 173, is connected up so as to have four branches, all marked 165, (corresponding with Fig. 32) and four foot valves, 159, which have already been described. The four separate branch lines, connected to the foot-valves, have been designated 166a, 166b, 166c, and 166d, corresponding to pipe 166 in detail Figure 32.

The four foot-valves, 159, have been given distinguishing letters. The one at the left "L B" denotes compressed air valve going to the "left brake" in the upper wing. "R R" marks the compressed air foot valve going to the propeller reversing cylinder in the upper left wing. "C C" marks the foot valve used for "centering the upper wing" in its normal position for the purpose of straight flight, or gliding, when the pilot prefers using the upper wing in the normal stationary position. "R B" denotes compressed air valve going to the "right brake" in the upper wing.

To simplify the explanation, I have marked the nest of valves, U1, U2, U3, etc., in Fig. 31 with the letters "CC", "RB", "LB", etc., to correspond with the foot-valves through which they receive compressed air.

The main compressed air line, 173, and also the four separate branches 166a, 166b, etc., are provided with small branches equipped with air cocks, all marked 174, assumed to be closed tight in the explanation of the operation that follows. These small branches are provided only for cross connecting the four valves shown, with another set of four foot valves of the dual control set, and the main compressed air line. When dual control is contemplated, it is advisable to make slight practical modifications in the individual system, either considerably reducing the size of the fixed air leak in screw plug 167, or else making other suitable modifications. However, these are details. To simplify a difficult description, it is assumed that only one set of pilot's foot-buttons are in operation at one time, and that all cross-connecting air pipes and the branch air main to the dual pilot's foot-valves are closed tight.

In Fig. 31, about the middle of the sheet, is shown a representation of the nest of six valves, U1, U2, U3, etc., in diagrammatic form of round discs; and showing how the air pipes are connected with these valves, and the diagrammatic paths (dotted lines) that the air takes in passing through these valves.

The parts in the upper half of Fig. 31 having been properly numbered, it is not necessary to explain them again. The air pipes and fittings are illustrated so that they can be recognized from the diagram. It is necessary to call special attention to the large circular track, 44, upon which the turret (indicated by tubes K. K. K. etc.) turns.

The oval form marked 175 is a perspective view of one of the compressed air pipes made in circular form for connecting up all of the twelve diaphragm air motors, 75, actuating the turret brakes on the circular turret track 44. The pipes 176, 177, 178, 179, 180 and 181 are all air pipes leaving the top of the nest of valves to go to various parts in the turret and in the upper wing.

In the air line, 176, is a fitting, 182, in the form of a small swing check valve. This valve consists of a very light swing check assisted by a very light spring to hold the check valve normally on its seat. The function of this valve is to permit the passage of compressed air of a higher pressure in going from pipe 176 in the direction of pipe 185; but at the same time preventing a higher pressure of compressed air in pipe 185 from going through the check valve in the opposite direction. In other words, this check valve is a "one direction non-return valve" which operates on a very slight pressure difference (preferably less than one pound per square inch). Similar "one direction non-return valves" are shown at 183 in pipe 180, and at 184 in the cross connection between continuations of lines 178 and 181. All these valves are shown with the valve flap closed, whereas a dotted line indicates the position of the valve flap in an imaginary position, when the compressed air is flowing through in the one proper direction.

The continuation of air line 178 has been marked 126 for connecting with the compressed air cylinder, 124, of the propeller reversing mechanism in the upper left wing. The air pipes in connection with the diaphragm motors of the brake drums, 85 and 86, in the upper left and upper right wing, have been marked 185 and 187 respectively.

In giving a description of the operation of the compressed air apparatus in Fig. 31, it is necessary for the purpose of clearness to confine the explanation as much as possible to the picture diagram; and not attempt to co-ordinate such explanation with other necessary and vital functions performed by other apparatus or by the pilot. It is assumed, therefore, that other apparatus and the pilot perform their various respective functions with accuracy and intelligence.

I will begin with the use of the simplest compressed air device in Fig. 31. Assuming that the air plane is in straight flight with the upper wing at right angles to the fuselage in its fixed normal position, and held tight in this position by the brake shoes on the turret track; in this kind of flight my airplane will resemble the straight flight of the ordinary present day plane. Now suppose for any reason the pilot, who is steering by means of pedal foot controls acting upon the rudders O and O' and auxiliary rudders J and J', wishes to steer by means of the propellers in the upper wing. At a proper moment in stable flight, he may take his feet out of the steering pedals and steer right or left by pressing the foot-buttons marked "L B" and "R B" respectively.

When the pilot lightly presses the left brake button L B, the compressed air stored in tank 32 is released into the pipe 166a, passes around the valve U4 and up through the rest of the nest of rotary valves into pipes 177 and 185 to the diaphragm air motor acting upon the brake band of brake drum 85. The action of the compressed air is to slightly tighten the band on the brake drum 85 on shaft 36, slowing up said shaft and the propellers in the upper left wing; while the differential gears in the casing 81 serve to automatically speed up the propellers in the upper right wing, resulting in a slight turning of the airplane toward the left, whereupon the left foot pressure is immediately removed. The effect of removing the foot from the left foot button is to immediately release its corresponding brake band; because by the action of the springs of the foot-button valve 159 the compressed air leaves the diaphragm motor by the same air line through which it enters, escaping from the foot-valve through the leak hole corresponding to that in screw plug 167. The size of the leak hole largely determines the speed of the escape or release. A turning action to the left, as described above, would probably require a slight quick pressure on the right foot-button "R B" in order to rectify and stabilize the flight in the direction intended. The action of the right foot-button is exactly similar to the left foot-button, except that it tightens the brake band on brake drum 86, and slows up the right wing propellers through compressed air going through pipes 167d, rotary valve U3 and pipes 179 and 187 to the diaphragm motor. In such case the upper left wing propellers automatically speed up.

It should be noted that when the left foot-button "L B" is operated, the check valve 182 remains tightly closed so that compressed air cannot back up into pipe 176. Correspondingly, when the right foot-button, "R B", is operated the check valve 183 remains tightly closed so that compressed air cannot back up into pipe 180.

This airplane is capable of "taking off" as a present day airplane, as a helicopter, or using a combination of these two methods. I will describe one instance of how the airplane "takes off". In Fig. 31 assume that the airplane is on the ground and that the pilot has started the engine slowly and that while he sits in his cabin he sets the adjustable pitch propellers (to be described later) located at the nose and tail of the fuselage, at a position to give such propellers only about one-third ($1/3$) of their normal pitch used for full speed ahead. The object of this is to give the airplane only a slight forward motion into the wind for taking off, because it is also assumed that the flying field is only a rough plowed field, not suitable for a run on the ground.

Under the above conditions the pilot has all his propellers running; but the upper wing is in its normal fixed position. On account of the rough field, or for any other good reason, the pilot prefers to "take off" using the helicopter principle. He therefore steps on the foot-button, R R, intended for reversing the upper left wing propellers and releasing the twelve sets of turret brake shoes, 70 and 71, holding the upper wing to the turret track. The effect of this action is to release the turret, causing the upper wing to revolve on the turret track. When the pilot opens up his engine and gives it more gasoline, this upper wing will revolve at such speed as to cause sufficient lift to "take off" or "hop off" at a very steep angle to the ground; after which the pilot may gradually give the engine still more gasoline and simultaneously increase the pitch of the nose and tail propellers, so as to improve the steerageway and controllability of the airplane. Under the above conditions the pilot uses his rudders and auxiliary rudders for steering. This attitude of climb may be maintained until a desired height is reached, at which point the pilot may increase the pitch of the nose and tail propellers to a moderate pitch, and set the engine revolutions at a low cruising speed ahead.

Of course, different conditions such as a smooth flying field, no wind, or perhaps the necessity of "hopping off" with the wind, would require modified operations by the pilot to meet the particular conditions.

I will now follow in the above instance the effect in detail of pressing the foot-button, R R in Fig. 31. The compressed air immediately goes through main pipe 173, branches 165 and 166c, to and through the rotary valve U2, up through the nest by means of pipe 178. From 178 the compressed air follows two routes, one route through pipe 186 leading into the compressed air reversing cylinder 124, where it compresses the spring and actuates the crosshead, reversing the pitch of the propellers in the upper left wing from "full pitch ahead" to "full pitch reverse". The compressed air coming into pipe 178 also pushes its way through the check valve 184, into pipes 175a and 181. The pipe 175a leads to the circular pipe 175 connected to all the twelve diaphragm motors, 75. These diaphragm motors, when supplied with compressed air, instantly release the upper wing by releasing the twelve brakes holding the wing turret to its track, 44. In the above operation the small diaphragm globe valve 188, in pipe 181, is closed by compressed air coming into pipe 186, thus acting upon the valve diaphragm, immediately closing the globe valve 188. So the diaphragm globe valve prevents any material quantity of compressed air from backing up into pipe 181, when the foot-button, R R, is operated. If the foot is removed from the foot-button, R R, the compressed air is released from the line 186, 178, 166c, etc., through the hole in screw plug 167 of valve 159. When the compressed air leaves these lines, then the pressure is released from the top of the small diaphragm globe valve 188, letting this latter valve open by the expansion of a spiral spring (similar in construction to spring 69 in Fig. 13). The position of the small globe valve 188 is normally open. It is only closed automatically by compressed air pressure coming into line 186, when the foot is applied to foot-button, R R.

Now assume that my airplane has reached some desired elevation, using the helicopter method of ascent. With the controls provided, it is feasible to steer, control and maneuver the airplane in any desired direction. The helicopter method, of sustaining the airplane in the air by revolving the large upper wing, makes this possible.

It must be understood that it is very advantageous to revolve the upper wing, when slow and moderate speeds of flight are contemplated,—speeds not feasible with present day airplanes. Yet there is likely to be some portion in the range of the airplane's speed, where it becomes more practicable, more economical, or otherwise more desirable, to shift from the revolving upper wing with its safety characteristics to the form of flight with which we are more familiar, namely the airplane with its wing, or wings, in a fixed position,—relatively crosswise to the axial line of the fuselage. Such relative crosswise position is intended to include those which have a marked "sweepback", similar to the lower wings of the airplane described herein.

In other words, I contemplate a shift in the "modus operandi" in flight, by centering my upper wing in a fixed position when I reach a certain range of speed (not yet demonstrated), where it is practicable and advantageous to shift from one method of flight to the other, and then to fly level in straight flight at higher speed. I contemplate making such shift just as one shifts gears in an automobile from perhaps "second gear" to "high gear" to attain more speed, smoother operation, greater economy, or some other purpose incident to travel conditions.

Contrarywise, it is also possible to shift back again, while in flight, from the present day method to the method of flight wherein the revolving upper wing is used. In shifting back to the revolving wing type of flight, the pilot may be governed by some object like wishing to fly more safely at a lower speed, contemplating a landing in a small space, making a steep climb, landing on rough ground, alighting on the water, or any other object; but more particularly for reasons involving the safety of the airplane, passengers or pilot.

The risks incident to making such shifts in the air seemed too great to warrant a practical demonstration, necessary to prove operativeness under actual conditions. However, as the invention was developed, the practicability of making a demonstration became more apparent. The engine cooling arrangement is independent of the speed of the airplane in flight, so that the engine can be tested at full power in the airplane on the ground. Likewise, the revolving upper wing can be installed and tested at maximum revolutions in the airplane, thus determining its lift, number of revolutions at full power etc. All this can be done with the airplane fastened to the ground, or better when fastened in the air on a platform. All the compressed air controls can be accurately tested, adjusted, and its functions accurately timed, before a flight of even a few feet above the ground is attempted at the lowest possible speed. The air pressure in the compressed air tank is also determined by experiment, and may be chosen anywhere from twenty (20) to one hundred (100) pounds per square inch.

I will now follow the effect of pressing foot-button C C in Fig. 31. Let us assume that the airplane has reached some very safe altitude—3000 or 4000 feet—using the helicopter method of flight. Assume that it is proceeding at a fair speed adapted to safely shifting from the helicopter method to the method of straight flight used by present day airplanes having fixed wings. At the right moment (determined by tests on the ground), catching the upper wing in its best position, the pilot takes his foot off foot-button R R and in the proper sequence steps upon foot-button C C. Releasing foot-button R R, results in automatically discharging compressed air from the reversing cylinder 124, so that the spring in this cylinder quickly throws the propellers in the upper left wing from their "full pitch reverse" into "full pitch ahead". This effect is produced by simply changing the pitch of the blades without altering the turning direction of their shaft. The turning direction of three of the shafts shown in Fig. 31 is indicated by arrows turning around the shafts 1a, 36 and 37. When foot-button R R is released, the compressed air (in lines 166c, 175, 175a, etc.) escapes through the opening in screw plug 167, of the particular valve 159, that is designated R R in the diagram Fig. 31. At the moment of this release, the turret brakes begin to grip the turret track, which is immediately corrected by the pilot stepping on foot-button C C in the proper time sequence, thus quickly admitting compressed air through line 166b, through valve U1 to 181, through valve 188 to lines 175a and 175, thus putting compressed air upon diaphragm motors 75. This air keeps the turret brakes free from the turret track until the upper wing is properly "centered". During the same time, the compressed air in pipe 166b branches off into the two lower rotary valves, U5 and U6, where its action is controlled by valve details shown on another sheet, (see Figs. 23 and 24), and already explained.

The effect of these two lower rotary valves when supplied with compressed air, is to center the upper wing in its correct position. The big wing comes automatically to rest at the central point after a slight oscillation. It is then held firmly in place by the automatic gripping of turret brakes due to the release of compressed air at Q in Figs. 23 and 24. When properly centered the further pressing of the foot-button has no effect. The experience gained by testing the rotary wing at various revolutions on the ground, together with a certain amount of experience in the air, should enable a pilot to center the upper wing with the least amount of oscillation. Such oscillation is rapidly damped by the action of upper left and upper right brakes, acting upon the wing propellers. The outstanding feature of this construction is bringing the enormous momentum of a big revolving wing to rest quickly and firmly, in a smooth scientific manner, by the use of the wing propellers without the use of any kind of a positive catch, or clutch, that would be apt to wreck the device, the structure, or crash the airplane sooner or later in actual service.

The pilot, having removed his foot from foot-button C C, finds it possible to use the airplane with fixed wings for straight flight as present day airplanes are used; and may make an ordinary glide, with or without power, to any good smooth landing field. It is also feasible to again shift back to the helicopter method of flight, and make a helicopter type of landing, using the upper wing in rotation.

It is contemplated, that if the helicopter type of flight is in use and the engine stops suddenly, the upper wing and propellers of the upper wing, will continue to revolve. Thus the upper wing can make a spiral glide toward the earth, due to its aerofoil action and momentum, and due to the inertia of the ariplane assisted by the force of gravity. Such a glide would correspond to the glide of a present day airplane. It would differ from it in character, because the force of gravity would be absorbed possibly to a greater extent in wing resistance (in rotating the upper wing); while slower linear landing speed would reduce the air resistance for the rest of the airplane. Of course, it is preferable to land the airplane with the engine running, so as to reduce the alighting force to a minimum.

The helicopter method of flight that I have described herein, makes possible increased climbing ability and also ability to lift comparatively heavy loads at low speed. This is attainable by using the engine power for lift in the upper wing instead of wasting it in horizontal wind resistance of fuselage, landing gear, struts, etc.

Turning now to Figs. 33, 34 and 35, we come to a new type of reversible pitch propeller, particularly adapted to aircraft. Its use is made necessary in order to carry out the purposes of my airplane; and by the fact that gas, or gasoline engines, in common use are not adapted to reversing the rotation of the engine itself. In steamships, propelled by steam engines, it is common practice to reverse the rotation of the engine. Such practice generally reverses the direction of a screw propeller, usually built to form an integral solid unit.

In the propeller described herein, the rotation of the engine shaft is continually in one direction only; so that to reverse the effect of the propeller, while turning in this one direction, it becomes necessary to reverse the pitch angle of the propeller blades, relative to the axis of the shaft, from a positive angle to a negative angle. In going from a positive to a negative angle of incidence, a very agreeable and smooth type of "feathering" occurs.

Some airplane propellers have been designed that may be capable of reversing the pitch angle of the propeller blades, but they have been found to be of little or no commercial value. They have been interesting experimentally, but they seem to lack essential qualities to meet the practical requirements of actual service. This is not at all surprising in view of the fact that it is very difficult indeed to find light materials strong enough to withstand vibration, enormous centrifugal force, and incidental forces inherent to spinning these propellers in the air at speeds up to 3000 revolutions per minute. Some propellers have failed in actual service even when made in one piece of the best metal material known. They also have failed when made up in solid laminations of the most carefully inspected woods, compositions, etc. The inherent difficulty must therefore be very great, to make the blades of a propeller shift, when even solid material is often strained to the breaking point,—leaving no factor of safety in operation.

In the accompanying drawings of the propeller, I have secured twisting, bending, and tensils strength, by the use of a hollow construction of hub. I then place the more delicate parts on the inside, at the core of the structure. All the parts required for strength form an extremely strong outside jacket around the hub, while all of the delicate shifting parts of the propeller, including the necessary grease lubricant, are completely housed and protected inside the jacket. They are thus placed beyond all possibility of external injury.

The inside mechanism of the propeller is essentially independent of stress and strain going from the engine shaft through the hollow hub, outwardly to the airstream of the blades. The idea of a strong exterior, completely protecting a more delicate inside mechanism, is typical of this propeller invention.

Some considerable progress has been made in the development of detachable blades, and making the pitch of these blades adjustable on the ground, but not in flight. Such propellers are often termed "semi-adjustable". But the kind referred to in this application, is not limited to adjusting the pitch of the blades on the ground. The adjustment can be made in flight by the pilot, while the propeller shaft is turning.

I make it easy to shift the pitch of the blades, whether the propeller shaft turns, or is at rest.

It is quite well known that if the pitch of aircraft propellers is changeable in flight, much greater efficiency can be attained; such as better climb and higher ceilings, due to adapting the propeller pitch to the load and engine requirements, and likewise adapting same to different altitudes having different air densities. High altitude conditions of low air density are partly met in the aircraft engine by what is known as a "supercharger",—an auxiliary air compressor for maintaining practically sea level air pressure at the engine carburettor at all altitudes.

In order to take advantage of such superchargers at elevations up to 20,000 feet, Lieut. Comdr. F. W. Wead, U. S. N., says:

"In order to avoid overreving at altitudes, therefore, supercharged engines must be equipped with propellers designed to give 100 to 250 revolutions less than normal at the ground. Such a combination is efficient at only one specific altitude, and the development of an efficient, reliable adjustable pitch propeller is essential if supercharged aircraft are to function with maximum efficiency at all altitudes."

The above quotation is from Lieut. Comdr. Wead's article on "Superchargers of airplanes" in Aviation Magazine, published September 19th, 1927, New York city.

However, the important utility of adjusting the pitch of a propeller for climb, shortening the landing, or for any other maneuver while in flight, is bound to be a valuable utility. To this has been added the useful quality of being able to reverse the propeller from some desired pitch ahead to a corresponding pitch astern by a gradual sliding action, making a smooth shift.

Fig. 33 is a two-bladed propeller sectioned on a line with the axis of the shaft, and in line with the axis of the blades. The hollow shaft 8, as well as the central shifting rod 10, are shown broken off at the right. Fig. 34 is a half section on the line $m$—$m$, Fig. 33; and half plan view, with certain parts shown in section, and certain other parts shown in full view, or broken, so as to best illustrate the construction.

In Figs. 33 and 34, we see the end of the hollow propeller shaft 8, expanded somewhat in diameter. The rod 10 for shifting the pitch of the blades has also been enlarged in the hollow end, 201, so as to obtain a stronger construction. 201$a$ are a pair of holes drilled into 201 for lubrication, and to equalize pressures, in the hub cap chamber and chamber 201$b$.

The hollow shaft 8 is provided with a flange 202. The propeller hub is of a hollow split form made in two halves 203 and 204. To complete the strong hollow hub, a streamline cap, 205, is provided having a special shaped flange corresponding to flange 202.

In Figs. 33 and 34, only the broken off cylindrical ends or shanks, 210 and 211, of the propeller blades are shown. This particular propeller has two blades, which is the number most generally used.

It is not necessary to describe the preferred internal construction and operation of the variable pitch propeller shown in Figs. 33, 33$a$, 33$b$, 34, 35, 35$a$, and 35$b$; because same is fully set forth in a co-pending patent application.

As drawn in Figs. 33 and 36, the propeller blades are assumed to be in their mid-position, where their twisted surfaces maintain no resultant axial thrust, when shaft 8 is turned by the engine. In the plan view, Fig. 34, the mid-position, based on the average effective pitch position of the propeller blades, may be represented theoretically by the neutral position OM. This position OM of the top blade is not the actual position, but represents a practical average position giving no resultant axial propeller thrust when the hollow shaft 8 turns as indicated by the curved arrow at the right of Fig. 34. With such turning of the shaft, and by moving the shifting rod 10 to the right, we would throw the average effective position of our top blade into position LL (Fig. 34) and the opposite blade into position L'L'. In such ahead position, this would be called a left hand propeller (having the effect of a left hand screw or helix) causing an axial pull on the shaft toward the left.

Thus when the shifting rod 10 is at the extreme right, and the top blade is "left hand" and in its normal position LL (Fig. 34), the opposite—"left hand"—blade will be in its corresponding position L'L'. Now by moving the shifting rod 10 from the extreme right to left, it will shift the general position of the top blade from position LL to say L'L', while the opposite blade will shift from position L'L' to say LL, thus reversing the propeller effect to full pitch reverse. It thus becomes apparent that by controlling the position of the shifting rod 10, we can cause the blades to assume any given pitch from full pitch ahead, through the neutral or midposition, to full pitch reverse.

However, it must be borne in mind that propeller blades are not ordinarily plain flat surfaces. They always have some thickness, which commonly leads to blades having surfaces that are convex on one side and comparatively flat on the other. Besides these things, they are usually helical in form, a property derived from giving propellers, more or less, a uniform pitch (advance) at the various diameters.

So it must be understood that a left hand propeller, designed for maximum efficiency, is very likely to be less efficient when shifted into its reverse position, where it would be compelled to run as a right hand propeller. As practical experience is acquired in the use of this invention, the better form of blades to meet particular conditions will become apparent or be derived from experiment. Such forms are now very well understood for fixed blades running in their normal direction. It is possible to have an infinite variety in the form of such blades, just as it is possible to have an infinite variety in the form of airplane wings. Therefore no attempt has been made herein to define any particular form of blade preferable for meeting the wide requirements of practical service. It need only be said, that with this type of propeller and any particular shape of blade; a greater field of usefulness will always be served, because of the capability of meeting engine characteristics, load variations, and aerodynamic requirements while in flight.

It must also be understood that the cams shown in Fig. 33 are only illustrative of a particular case, covering the broad requirements of full pitch ahead to full pitch reverse. The shape of the cams may be varied to suit any other requirements. For example, if it were only required to vary the pitch from full normal pitch ahead to 25% above, and below, the normal, the cams would be designed accordingly. The cams of the nose propeller may be different from those in the tail propeller, while the travel of the shifting rods would preferably be the same to keep the idea in simple form.

We now come to an important matter,—a pitch shifting device for a propeller that will positively and accurately tell the pilot at all times the exact position (pitch) of his propeller blades. Without knowing the exact setting of the blades, a pilot might momentarily be deceived by the engine tachometer as to the power being delivered by his engine. With a fixed pitch the engine power would vary with the revolutions. The engine power and revolutions will now vary with every different setting of the propeller blades, when all other engine settings remain the same. Hence the importance of knowing the exact pitch of the propeller at all times. Such knowledge must be accurate and convenient to the pilot's vision.

Fig. 36 shows a plan view of such a device drawn for the airplane illustrated herein. The parts marked P, 1, 7, 8, 9, 10, 11 are already known from Fig. 6. A small control shaft 226, runs from a propeller shifting yoke 227, in gear case 7, to an indicating device with handwheel 228, shown in detail Fig. 36a. This indicating device and handwheel is located in the pilot's cabin about level with hollow shaft 8. The shifting yoke 227, has two forked ends, 227a and 227b, engaging grooves in the propeller shifting rods, 10 and 11. These forked ends allow the propeller shifting rods to turn, but hold them axially in a fixed position. The body of the shifting yoke is threaded, right-hand, to receive a threaded portion of the control shaft 226. The shifting yoke is made preferably in two halves (upper and lower) for the purpose of installation. The six black dots on this yoke represent small bolts used to fasten the upper and lower halves together. Collars 229 are pinned to the control shaft 226, to maintain its longitudinal position with relation to the gear box 7.

It becomes apparent that when the control shaft is turned either way, it will cause the shifting yoke 227 to move correspondingly either to the right or to the left, inducing the variable pitch nose propeller P to shift from its mid-position either towards its "ahead" position, or towards its "reverse" position. Likewise the tail propeller is simultaneously shifted.

Fig. 36a shows a handwheel and a pair of gears 229a, adapted to conveniently turn the control shaft 226, whose left end is threaded "left hand" to accommodate a travelling nut 230, having an index finger and jaw clutch faces. These faces engage corresponding jaw clutch faces on collars 231 and 232. The collars are pinned onto the threaded portion to limit the motion of the travelling nut without jamming.

By moving the hand wheel forward in direction marked l, the travelling nut 230 will gradually indicate the increase of the propeller pitch in the forward direction on the indicator scale 233, from the mid-position M, to full forward pitch L. By moving the hand wheel back from the mid-position in the opposite direction marked l', the travelling nut 230, will gradually indicate the full reversing pitch L' on scale 233. Any convenient information like corresponding engine revolutions may be added in any parallel scale alongside the pitch scale.

Incidentally and simultaneously, the other forked end of shifting yoke 227, shifts the tail propeller P', through the propeller shifting rod 11. It should be observed that the positions L and L' on the indicating scale 233, correspond respectively to the positions LL and L'L' of the effective blade pitch in Fig. 34.

An interesting property is incorporated in the propeller shifting mechanism. The shift is made by a hand wheel, wedge-like cams, and a screw motion. This is done to give a certain amount of smoothness and slowness to the motion to guard against careless handling. Furthermore, the cams and the screw motion are made to be self-locking, so that the hand may be removed in any position of the motion and leave the mechanism in a state of repose, holding any given propeller pitch. This feature, however, is not used in the steering propellers, described as auxiliary rudders, J and J', because of not wishing to lock the rudder mechanism.

It should be understood that only simple explanations of the airplane's performance have been given, whereas various kinds of "stunts", so-called, may be performed by the skillful use of apparatus described herein. This new aircraft is capable of performing exceptional feats in the air that are beyond simple description, utilizing the skill of a good pilot, and within the scope of this invention.

My ideas are thoroughly disclosed in the drawings. The description is supplementary to them. As regards the adaptation of engineering principles and methods to mechanical flight, the aircraft is capable of achieving new, useful and surprising results. It should, perhaps, be demonstrated in actual flight before its achievements can be properly appraised and appreciated.

In accordance with the provisions of he patent statutes, I have described herein the general principle of operation underlying my invention, together with apparatus representative of its embodiment. I desire to have it understood that such apparatus is only illustrative, and that the invention may be carried out by other means within the purview of this invention. Also while it is designed to use the various features and elements in the combinations and relations described, some of these may be altered and others omitted without interfering with the more general results outlined, and the invention extends to such use.

Having described my invention, what I claim and desire to secure by Letters Patent is:

1. In a helicopter, having a fuselage provided with a motor, propellers, and adequate flying control surfaces; the combination of a revolving upper wing mounted upon a turret, with a central vertical power shaft, the turret rotating upon a track in the fuselage at the turret base, the upper part of the turret being provided with differential gears transmitting power from the vertical shaft to planetary propellers mounted on the rotating wing, said planetary propellers serving to drive the wing in rotation as a helicopter.

2. The combination in a helicopter, having a large revolving upper wing and turret, a motor with a vertical shaft, provided with a flexible ratchet coupling, differential gears at the top of the vertical shaft actuating horizontal shafts, gears and propellers, which rotate said upper wing, the flexible ratchet coupling serving to automatically disconnect the engine from the upper part of the shaft in case of engine failure in flight.

3. A flying and lifting unit of a flying machine comprising a large revolving wing mounted on a turret of a fuselage, whose motor and central shaft transmit power through differential gears, shafting, and other means, to planetary propellers mounted on the wings, said differential gears serving to automatically compensate the propeller torques while driving the wings in rotation for obtaining lift and flight.

4. A helicopter flying and lifting unit, comprising a large revolving wing and turret, mounted on a fuselage, said wing being rotated from an aircraft motor by means of planetary propellers, differential gear transmission, central shaft and shafting; said differential transmission automatically compensating for variable wind resistance of the planetary propellers.

5. In a flying machine, the combination of a motor centrally arranged in a fuselage, a helicopter flying and lifting unit mounted thereon, consisting of a large upper wing, two or more planetary propellers symmetrically mounted on the upper wing for driving said wing in rotation, said planetary propellers being driven from a central vertical shaft through differential gears and transmission shafts, the flying machine being also provided with lower wings, additional power shafts with propellers for speed, alighting device, and adequate control surfaces for maneuvering in flight.

6. In an airplane comprising in part a fuselage, a low central motor, fixed lower wings with ailerons, and means for differential power transmission to multiple propellers; the combination of a helicopter and an airplane, in which the machine may be flown alternately either as a helicopter or as an airplane; such machine being convertible in flight from one method of sustentation to the other and vice versa; the means of conversion consisting principally in utilizing a large upper wing either as a fixed or as a revolving wing, and reversing the pitch of the blades of planetary propellers mounted on one side of said upper wing, and leaving unchanged corresponding propellers on the other side.

7. The combination either in an airplane or a helicopter, of a motor with a vertical (normal) shaft, differential gears at the top of said vertical shaft in a large upper wing, horizontal differential shafts with gears for driving two or more propellers on this wing; said differential gears serving to automatically balance the torques of the propellers in variable winds and helping to stabilize the airplane or helicopter in flight.

8. The combination in a motor driven aircraft having a fuselage: of a fixed or revolving upper supporting wing directly above the motor, a rear steering rudder with its control, a lower supporting wing having marked sweep back, and a control operating ailerons on the lower wing for obtaining both longitudinal and lateral stability of the aircraft in flight, eliminating the use, and control, of a horizontal tail element.

9. In a motor driven airplane, or helicopter, including a rudder, the mechanism for steering the flying machine to the right or to the left by the use of the rudder assisted by small rotating variable pitch propellers, serving as auxiliary rudders, whose pitch adjusting mechanism is connected to, and works in harmony with, a rudder control; affording good control of the aircraft's direction irrespective of its horizontal speed.

10. In a helicopter flying and lifting unit, comprising a revolving wing attached to a turret frame having a rolling base upon a circular rail of a fuselage; whose central motor and vertical shaft transmit power through shafting and gears to planetary propellers on said revolving wing: the combination of a flexible ratchet coupling in the vertical shaft, and adjusting means for tilting the rail in the helicopter's fuselage, so as to give the revolving wing either positive or negative incidence by proper adjustment on the ground.

11. The combination in a helicopter comprising in part a wing driven by planetary propellers from a central motor in a fuselage; of a flexible one-way coupling in the vertical shaft of said motor, and differential gears in shaft transmissions to planetary propellers for driving the wing in rotation: whereby the differential serves to transmit balanced torques to the planetary propellers, and the one-way coupling permits free rotation of the planetary propellers and wing, when motor slows down, idles, or stops.

12. In an airplane provided with a fuselage, sustaining wings, and necessary flying control surfaces with controls; the combination of a central motor with vertical shaft, gearing, and transmission shafts distributing power to nose and tail propellers, and also distributing power to symmetrical wing propellers through a flexible one-way coupling, differentials, wing shafts and gears; said combination serving as a wide distribution of power for augmenting the climbing capacity and stability of the airplane in flight.

13. In an airplane comprising in part laterally extending lower planes with control surfaces and fuselage; the combination of a central motor, vertical transmission shaft driving planetary propellers through gearing and shafting for revolving an upper wing: such gearing including a differential gear for automatically balancing the torques of the planetary propellers, so as to compensate for variable wind resistance in flight.

14. The combination in an airplane comprising in part laterally extending wings with control surfaces, fuselage and motor; of differential gears with differential shafts geared to wing propellers, said differential shafts having respectively right and left hand brake drums with brake bands, and means for operating the brake bands: whereby the airplane may be banked and steered at will to the right, or to the left, by proper use of the aforesaid brake mechanisms.

15. The combination in a flying machine comprising in part, laterally extending lower wings with ailerons, of a motor centrally located in a fuselage having a vertical shaft, means for transmitting power to planetary propellers driving an upper revolving wing as a lifting unit, said vertical shaft being provided with a gear meshing with gears turning longitudinal shafts mounting variable pitch propellers, and means for setting the blades of said variable pitch propellers at any pitch, positive, neutral, or negative, while in flight.

16. The combination in the fuselage of a helicopter or an airplane, of a midship compartment having a central aircooled motor with a vertical power shaft transmitting power through gearing and shafting to propellers; a cooling fan attached to said vertical shaft and drawing outside air through an inlet casing in the upper part of the compartment while discharging said air through a casing surrounding the engine: the air thus warmed by the engine being forced into the engine compartment, and discharged to the outside air through openings provided for the purpose.

17. The combination in aircraft of a low aircooled motor in the central part of a fuselage, said motor having a vertical shaft transmitting power through gearing and shafting to propellers, a motor cooling fan attached to said vertical shaft and drawing fresh air through a fresh air inlet casing from an opening in the midship section of the fuselage, and distributing said air through a casing over the engine to outlets in the fuselage; whereby weights are concentrated for stability in the midship section, and engine cooling is made mainly proportional to the number of engine revolutions.

18. The combination in a helicopter or an airplane, of a midship compartment in a fuselage surrounding a central aircooled motor having a vertical power shaft transmitting power through gearing and shafting to propellers; a cooling fan attached to said vertical shaft and drawing outside air through an inlet casing with inlet shutters in the upper part of the compartment while discharging said air through a casing surrounding the engine: the air thus warmed by the engine being forced into the engine compartment, means for recirculating and controlling the temperature of air within the compartment before discharge to the outside air through openings provided for the purpose; whereby air conditions are improved for engine operation.

19. A combination airplane and helicopter, including a fuselage, a turreted upper revolving wing having differentially operated planetary propellers driven by gears and shafting from a central motor, lower wings with adequate control surfaces, flying controls, alighting gear, and an empennage consisting of a tapered end of the fuselage, a rear fin and steering rudder, and a revolving auxiliary rudder, without the usual horizontal stabilizer and elevator.

20. The safety device in an airplane consisting in part of a turreted upper wing with propellers driven from an engine in a fuselage, said wing being capable of revolving upon a circular rail of the fuselage but constrained athwartships by automatic friction brakes connecting the fuselage with said wing when flying as an airplane, compressed air means for releasing said brakes at will and simultaneously reversing the pitch of the propellers on one side of said wing; whereby the upper wing is released and started in motion as a revolving wing assisted by the momentum of propellers on its structure, for safe descent.

21. In a combination airplane and helicopter, a flying, lifting, and lowering unit, comprising in part an upper revolving wing and turret, mounted on a fuselage, said wing being rotated from an aircraft motor by means of planetary propellers, differential gear transmission, central shaft and shafting, including a safety one-way coupling in the central shaft: whereby in case of engine failure with helicopter method of flight, the planetary propellers, and upper wing are disconnected from the engine and continue to revolve for lowering the machine gently to the ground.

22. In a combination airplane and helicopter, comprising in part a revolvable upper wing and turret, fastened by brakes to a fuselage; said upper wing mounting pairs of propellers driven by an aircraft motor, differential gear transmission, central shaft and shafting, including a safety one-way coupling in the central shaft, means for quickly releasing said brakes and reversing the pitch of the blades in the propellers on the left side of the upper wing: whereby in case of engine failure or other emergency during the airplane method of flight, the upper wing and propellers may be started in revolution for lowering the machine gently to the ground.

23. The combination in an airplane, comprising in part laterally extending wings with control surfaces, fuselage, and motor; of a flexible one-way coupling in the motor shaft, differential gears with differential shafts geared to wing propellers: whereby the differential serves to balance the torques of the wing propellers, and the one-way coupling permits free rotation of the wing propellers in a glide, when the motor stops, slows down, or idles.

24. In a flying machine having flying control surfaces and a low central motor, a revolvable upper wing, lower fixed wings, a plurality of propellers including those for revolving said upper wing, differential power transmission means serving said propellers, means to electively hold said revolvable wing stationary, and control means adapted to be actuated by compressed air for releasing said holding means; all whereby flight as a helicopter with revolving upper wing, or as an airplane with fixed upper wing may be selectively attained.

25. In a flying machine having a central motor, the combination of a revolvable upper wing, a revolvable turret structure for mounting said wing on the flying machine, a central power shaft driven by the motor, reversible and fixed pitch propellers respectively mounted on opposite end portions of said upper wing, means for transmitting shaft power to said propellers, brakes for holding said turret structure to electively dispose said upper wing in fixed athwartship position, means operable by compressed air for releasing said brakes, means operable by compressed air for reversing the pitch of said reversible propellers, means operable by compressed air to differentially vary the speed of upper wing propellers, a compressed air supply, piping to distribute compressed air from said supply to the various means operable thereby, and a system of control valves manipulatable to selectively deliver compressed air to desired means operable thereby.

26. In a combined helicopter and airplane having a central motor, a revolvable upper wing, fixed pitch and reversible pitch propellers carried by said upper wing, a vertical shaft driven by said motor, differential gear and shaft transmission means between said vertical shaft and said propellers carried by the upper wing, means for centering and holding said upper wing in non-revolving athwartship position for airplane method of flight, means for releasing said upper wing for free revolution in helicopter method of flight, means operable by compressed air for actuating said upper wing centering and holding means, means operable by compressed air for automatically timing and regulating the relative pitch and speeds of said differentially geared propellers, rotary valves for controlling the distribution of operating air to said two last mentioned means, an air supply means, and manipulatable valve means for controlling the delivery of air from said supply means to said distributing rotary valve.

27. The combination with an airplane having essential machinery weights including the aircooled driving motor located in a substantially central position in the fuselage close to the airplane's center of sustention and below the center of gravity to thereby minimize dissemination of vibration and ensure lateral and longitudinal stability, of means to continuously remove the boundary layer of air from the upper surface of the airplane fuselage to thereby minimize parasite drag, and means to utilize the air thus removed as a cooling medium for the driving motor.

In testimony whereof I affix my signature.

EMIL A. BRINER.